(12) United States Patent
Patel et al.

(10) Patent No.: US 11,926,784 B2
(45) Date of Patent: Mar. 12, 2024

(54) SIMULTANEOUS ASSOCIATION-DISSOCIATION OF LAYERED SILICATES ON POLYMERS TO IMPROVE RHEOLOGY OF DRILLING FLUIDS

(71) Applicant: Saudi Arabian Oil Company, Dhahran (SA)

(72) Inventors: Hasmukh A. Patel, Houston, TX (US); Carl Thaemlitz, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/856,373

(22) Filed: Jul. 1, 2022

(65) Prior Publication Data

US 2024/0002716 A1    Jan. 4, 2024

(51) Int. Cl.
*C09K 8/14* (2006.01)
*C09K 8/16* (2006.01)
*E21B 7/00* (2006.01)

(52) U.S. Cl.
CPC ............... *C09K 8/145* (2013.01); *C09K 8/16* (2013.01); *E21B 7/00* (2013.01)

(58) Field of Classification Search
None
See application file for complete search history.

(56) References Cited

U.S. PATENT DOCUMENTS

| 4,490,261 | A | * | 12/1984 | Heilweil | ............... | C09K 8/528 |
| | | | | | | 524/548 |
| 4,554,081 | A | * | 11/1985 | Borchardt | ............... | C09K 8/12 |
| | | | | | | 507/120 |
| 4,609,476 | A | * | 9/1986 | Heilweil | ................... | C09K 8/12 |
| | | | | | | 507/926 |
| 5,071,934 | A | * | 12/1991 | Peiffer | ................... | C09K 8/588 |
| | | | | | | 526/303.1 |
| 5,112,603 | A | * | 5/1992 | Nadolsky | ................ | C01B 33/44 |
| | | | | | | 507/131 |
| 10,144,865 | B2 | | 12/2018 | Zelenev et al. | | |

* cited by examiner

*Primary Examiner* — Charles R Nold
(74) *Attorney, Agent, or Firm* — Dinsmore & Shohl LLP

(57) ABSTRACT

A drilling fluid comprises an aqueous solution; a clay-based component comprising layered silicate; and a viscosifier additive comprising poly(acrylamide-co-diallyldimethylammonium chloride) (poly(AAm-co-DMAC)) polymer. The polymer comprises a number average molecular weight of from 10,000 g/mol to 2,000,000 g/mol. The layered silicate and poly(AAm-co-DMAC) reacts to form a silicate-poly (AAm-co-DMAC) complex within the aqueous solution. A mass ratio of the poly(AAm-co-DMAC) to the layered silicate is 1 to 8.

17 Claims, 9 Drawing Sheets

SIMULTANEOUS ASSOCIATION-DISSOCIATION OF LAYERED SILICATES ON POLYMERS TO IMPROVE RHEOLOGY OF DRILLING FLUIDS

BACKGROUND

Field

The present disclosure relates to natural resource well drilling and, more specifically, to drilling fluids comprising aqueous solution, clay-based component, and a viscosifier additive.

Technical Background

During rotary drilling of a well, a drill bit is inserted into a pre-drilled hole and rotated to break, crush, or cut the rock at the bottom of the hole to form the well. Drilling fluids are pumped down through a drill string to the drill bit and are recirculated back to the surface, which functions to lift and remove pieces of rock, also referred to as cuttings, produced during drilling from the bottom of the well. Common classifications of drilling fluids include aqueous based and oleaginous based drilling fluids. The oleaginous based drilling fluids have higher operational efficiencies as compared to the aqueous based drilling fluids. However, the use of oleaginous based drilling fluids has been declined due to the environmental issues. The aqueous based drilling fluids have been considered as the most favorable drilling fluids among them, owing to their inherent advantages such as economically viability and environmentally benign characteristics.

However, the rheology of aqueous based drilling fluids may be degrade while drilling under certain extreme downhole conditions, such as high pressure (e.g., greater than or equal to 20 MPa) and high temperature (e.g., greater than or equal to 150° C.) (HPHT)). The detrimental rheological properties of aqueous based drilling fluids under HPHT result into pipe sticking, low rate of penetration of the drill bit and requirement of high torque for drilling operations. The bentonite clays, polymers, or combinations of these have been employed to maintain the rheological properties of aqueous based drilling fluids. However, bentonite clays lost their effectiveness at HTHP even though it has been added in large quantity. Polymers, natural or synthetic, are undergoing degradation or thinning of viscosity with respect to rise in temperature. Water soluble branched polymers, water swellable branched polymers, co-polymers, and star polymers, are used to improve the performance of the aqueous based drilling fluids, but these polymers alone may not be sufficient to achieve the desired rheology for drilling fluids. Therefore, these polymers have been blended with other additives to perform the required jobs. However, natural polymers, such as cellulose and xanthan gum derivatives, have also been explored which tend to degrade at high temperature although they are blended with other supplementary additives. Further, conventional viscosifiers, rheological modifiers, or both, should need to undergo extensive modifications to be employed in the aqueous based drilling fluids.

SUMMARY

Accordingly, there is an ongoing need for aqueous based drilling fluids having improved rheology under extreme downhole conditions (e.g., greater than or equal to 20 MPa and greater than or equal to 150° C.). The drilling fluids of the present disclosure mitigate the aforementioned problems. Specifically, the drilling fluids disclosed herein include an aqueous solution; a clay-based component comprising layered silicate, and a viscosifier additive comprising poly (acrylamide-co-diallyldimethylammonium chloride) (poly (AAm-co-DMAC)) polymer. The polymer comprises a number average molecular weight of from 10,000 g/mol to 2,000,000 g/mol. A mass ratio of the poly(AAm-co-DMAC) to the layered silicate is 1 to 8. The presence and specific amount ratio of layered silicate and polymer result in a drilling fluid having improved or maintained rheology at high pressures and high temperatures as compared conventional drilling fluids. Specifically, the layered silicate and poly(AAm-co-DMAC) reacts to form a silicate-poly(AAm-co-DMAC) complex within the aqueous solution. The silicate-poly(AAm-co-DMAC) complex easily be dispersed in the aqueous solution, and thus contribute toward improving viscosity of the drilling fluid. Under extreme downhole condition, low molecular weight blocks of the polymer may be dissociated from the surface of the layered silicate, but the higher molecular weight polymer may allow the detached layered silicate to link at other sites of the polymer simultaneously. Thus, these intercalated silicate-poly(AAm-co-DMAC) complexes in the drilling fluid are preserved, and the drilling fluids have the improved rheological properties under extreme downhole conditions with minimum additives.

According to one or more embodiments of the present disclosure, a drilling fluid comprises an aqueous solution; a clay-based component comprising layered silicate; and a viscosifier additive comprising poly(acrylamide-co-diallyldimethylammonium chloride) (poly(AAm-co-DMAC)) polymer. The polymer comprises a number average molecular weight of from 10,000 g/mol to 2,000,000 g/mol. The layered silicate and poly(AAm-co-DMAC) reacts to form a silicate-poly(AAm-co-DMAC) complex within the aqueous solution. A mass ratio of the poly(AAm-co-DMAC) to the layered silicate is 1 to 8

Additional features and advantages of the technology described in the present disclosure will be set forth in the detailed description that follows, and in part will be readily apparent to those skilled in the art from the description or recognized by practicing the technology as described in this disclosure, including the detailed description that follows, as well as the claims.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
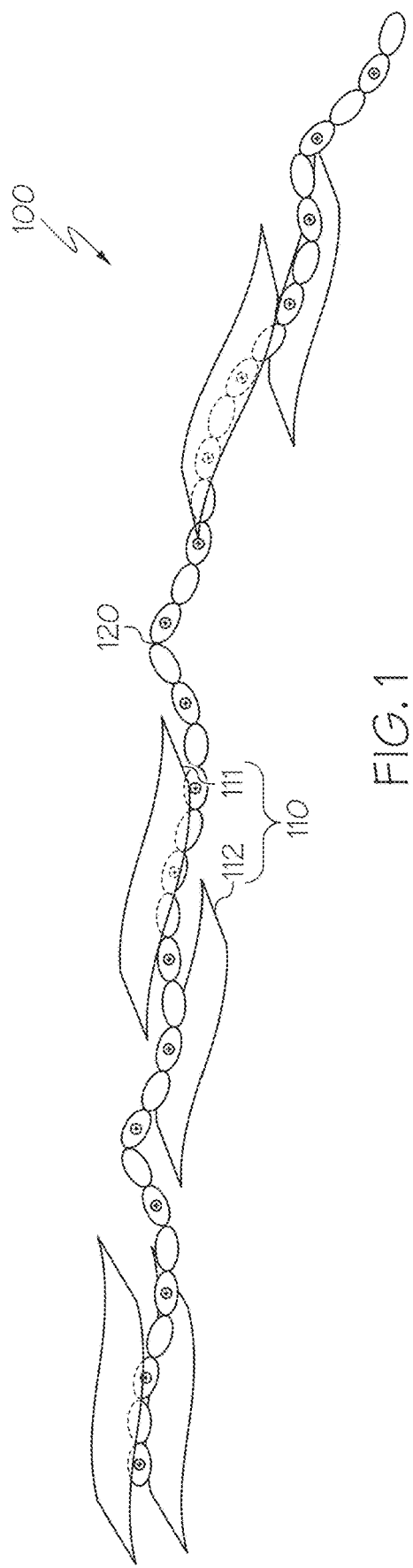
FIG. 1 schematically depicts simultaneous interaction of layered silicates on the polymers through association-dissociation mechanism under excessive downhole condition.

Embodiments of the present disclosure are directed to drilling fluids for drilling wells in subterranean formations using such drilling fluids. A subterranean formation is the fundamental unit of lithostratigraphy. As used in the present disclosure, the term "subterranean formation" refers to any geological area under the surface of the Earth, either under land or under water. In some embodiments, a subterranean formation may be a body of rock that is sufficiently distinctive from the surrounding bodies of rock such that the body of rock can be mapped as a distinct entity. Subterranean formations are homogenous and form single identifiable units having similar geological properties throughout the unit, such as porosity and permeability. Subterranean formations may comprise different regions, where some regions comprise hydrocarbons and others do not. Production wells may be drilled to extract hydrocarbons from the hydrocarbon-bearing regions of subterranean formations. The wellbores of production wells connect the hydrocarbon-bearing regions of subterranean formations to the surface and enable hydrocarbons to travel from the subterranean formation to the surface. As used in the present disclosure, the term "wellbore" refers to the drilled hole of a well, which includes the openhole, or uncased portion of the well.

The two primary methods for drilling a well in a subterranean formation are rotary drilling and cable-tool drilling. During rotary drilling of a well, a drill bit is inserted into a pre-drilled hole and rotated to break, crush, or cut the rock at the bottom of the hole to form the well. Drilling fluids are pumped down through a drill string to the drill bit and are recirculated back to the surface, which functions to lift and remove pieces of rock, also referred to as cuttings, produced during drilling from the bottom of the well. Drilling fluids commonly serve additional functions during drilling, such as providing hydrostatic pressure sufficient to support the sidewalls of the well, which prevents the sidewalls from collapsing and caving in on the drill string and prevents fluids present in the subterranean formation from flowing into the well during drilling.

Common classifications of drilling fluids include aqueous based and oleaginous based drilling fluids. As used in the present disclosure, the term "aqueous based drilling fluids" refers to drilling fluids comprising water as the major constituent. Aqueous based drilling fluids generally comprise an aqueous base solution and a plurality of additives, such as bridging materials, clay stabilizers, emulsifiers, fluid loss control materials, and weighting materials. The use of oleaginous based drilling fluids has been declined due to the environmental issues. The aqueous based drilling fluids have been considered as the most favorable drilling fluids because of their inherent advantages, such as economically viability and environmentally benign characteristics. However, subjecting the aqueous drilling fluid to extreme downhole temperatures may degrade the rheological properties of the conventional aqueous drilling fluids, such as, thicken the drilling fluids, excessively increase in viscosity, undergo gelation, or any combination of these. The detrimental rheological properties of aqueous based drilling fluids can result into pipe sticking, low rate of penetration of the drill bit and requirement of high torque for drilling operations, such as excessive pump pressure.

Embodiments of the present disclosure are directed to drilling fluids which mitigate the aforementioned problems. Specifically, the drilling fluid of the present disclosure comprise an aqueous solution, a clay-based component comprising layered silicate, and a viscosifier additive comprising poly(acrylamide-co-diallyldimethylammonium chloride) (poly(AAm-co-DMAC)) polymer. The presence and specific amount ratio of layered silicate and polymer may allow to form a silicate-poly(AAm-co-DMAC) complex, which may easily be dispersed in the aqueous solution. Under extreme downhole conditions, the silicate-poly (AAm-co-DMAC) complex may allow simultaneous interaction of layered silicates on the polymers through association-dissociation mechanism as described below, and thereby improving the rheological properties of drilling fluids.

The drilling fluid described in the present disclosure may serve several functions in the drilling process. The drilling fluid may provide lubrication and cooling to the drill bit. The drilling fluid may also aid with cleaning the wellbore by transporting rock cuttings from the drill bit to the surface. The drilling fluid may provide hydrostatic pressure in the wellbore to provide support to the sidewalls of the wellbore and prevent the sidewalls from collapsing and caving-in on the drill string. The drilling fluid may provide hydrostatic pressure in the wellbore to prevent fluids in the downhole formations from flowing into the wellbore during drilling operations.

The drilling fluid of the present disclosure may comprise an aqueous solution. As used in the present disclosure, the term "aqueous" refers to fluids or solutions comprising water as the major constituent. The drilling fluids of the present disclosure may comprise an aqueous solution in an amount sufficient to achieve a suitable viscosity.

Various aqueous solutions are considered suitable for the present drilling fluid. In embodiments, the aqueous solution may be a water based solution. In embodiments, the aqueous solution may comprise deionized water, tap water, fresh water, salt water, brine, municipal water, formation water, produced water, well water, filtered water, distilled water, sea water, or combinations thereof.

In embodiments, the aqueous solution may be a brine based solution. Without being bound by any particular theory, it is believed an aqueous solution incorporating salt or other organic compounds, such as brine, may be suitable to control the density of the drilling fluid. For example, increasing the saturation of the aqueous solution by increasing the concentration of salt or other organic compounds in the aqueous solution may increase the density of the drilling fluid. Suitable salts may comprise alkali metal chlorides, hydroxides, formats, carboxylates, or combinations of these. For example, the aqueous solution may comprise sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations of these. In embodiments, the brine based solution may comprise NaBr brine, $CaCl_2$ brine, $ZnBr_2$ brine, Cs formate brine, or combinations thereof.

In embodiments, the brine based solution may have a density of greater than or equal to 1.0 $g/cm^3$, greater than or equal to 1.2 $g/cm^3$, or even greater than or equal to 1.3 $g/cm^3$. In embodiments, the brine based solution may have a density of less than or equal to 4.5 $g/cm^3$, less than or equal to 4.0 $g/cm^3$, less than or equal to 3.5 $g/cm^3$, less than or equal to 3.0 $g/cm^3$, less than or equal to 2.75 $g/cm^3$, or even less than or equal to 2.5 $g/cm^3$. In embodiments, the brine based solution may have a density of may be from 1.0 $g/cm^3$ to 4.5 $g/cm^3$, from 1.0 $g/cm^3$ to 4.0 $g/cm^3$, from 1.0 $g/cm^3$ to 3.5 $g/cm^3$, from 1.0 $g/cm^3$ to 3.0 $g/cm^3$, from 1.0 $g/cm^3$ to 2.75 $g/cm^3$, from 1.0 $g/cm^3$ to 2.5 $g/cm^3$, from 1.2 $g/cm^3$ to 4.5 $g/cm^3$, from 1.2 $g/cm^3$ to 4.0 $g/cm^3$, from 1.2 $g/cm^3$ to 3.5 $g/cm^3$, from 1.2 $g/cm^3$ to 3.0 $g/cm^3$, from 1.2 $g/cm^3$ to 2.75 $g/cm^3$, from 1.2 $g/cm^3$ to 2.5 $g/cm^3$, from 1.3 $g/cm^3$ to 4.5 $g/cm^3$, from 1.3 $g/cm^3$ to 4.0 $g/cm^3$, from 1.3 $g/cm^3$ to 3.5 $g/cm^3$, from 1.3 $g/cm^3$ to 3.0 $g/cm^3$, from 1.3 $g/cm^3$ to 2.75 $g/cm^3$, or even from 1.3 $g/cm^3$ to 2.5 $g/cm^3$, or any and all sub-ranges formed from any of these endpoints.

In embodiments, the aqueous solution may be included in amounts greater than or equal to 82 wt. %, greater than or equal to 84 wt. %, or even greater than or equal to 85 wt. %. In embodiments, the amount of aqueous solution in the drilling fluid may be less than or equal to 99 wt. %, less than or equal to 98 wt. %, or even less than or equal to 95 wt. %. In embodiments, the amount of aqueous solution in the drilling fluid may be from 82 wt. % to 99 wt. %, from 82 wt. % to 98 wt. %, from 82 wt. % to 95 wt. %, from 84 wt. % to 99 wt. %, from 84 wt. % to 98 wt. %, from 84 wt. % to 95 wt. %, from 85 wt. % to 99 wt. %, from 85 wt. % to 98 wt. %, or even from 85 wt. % to 95 wt. %, or any and all sub-ranges formed from any of these endpoints.

The drilling fluid of the present disclosure may comprise a clay-based component. As used in the present disclosure, the term "clay-based" refers to fluids or solutions comprising clay as the major constituent. The drilling fluids of the present disclosure may comprise a clay-based component in an amount sufficient to achieve a suitable density, viscosity, or both.

Various clay-based components are considered suitable for the present drilling fluid. In embodiments, the clay-based component may comprise bentonite, montmorillonite, hectorites, alumino-silicates, magnesium-silicates, lime (CaO), $CaCO_3$, barium sulfate (barite), hematite ($Fe_2O_3$), mullite ($3Al_2O_3 \cdot 2SiO_2$ or $2Al_2O_3 \cdot SiO_2$), kaolin, ($Al_2Si_2O_5(OH)_4$ or kaolinite), alumina ($Al_2O_3$, or aluminum oxide), silicon carbide, tungsten carbide, or combinations thereof. In embodiments, the clay-based component may comprise cationic clays.

In embodiments, the clay-based component may comprise layered silicate. Referring to FIG. 1, the layered silicate 110 may interact with the poly(AAm-co-DMAC) polymer 120 to form a silicate-poly(AAm-co-DMAC) complex 100 as described below. In embodiments, the layered silicate comprises a first silicate layer 111 and a second silicate layer 112. In embodiments, under extreme downhole condition (greater than or equal to 20 MPa and greater than or equal to 150° C.), at least one of the first silicate layer 111 and the second silicate layer 112 may interact with the poly(AAm-co-DMAC) polymer 120. In embodiments, when the clay-based component comprises bentonite, the poly(AAm-co-DMAC) polymer may interact with the bentonite to form a bentonite-poly(AAm-co-DMAC) complex (B-PAD). The silicate-poly(AAm-co-DMAC) complex 100 easily be dispersed in the aqueous solution, and thus contribute toward improving viscosity of the drilling fluid. In addition, the silicate-poly (AAm-co-DMAC) complex 100 may be compatible with various brine based solution in addition to water and facilitate enhanced rheological properties.

The drilling fluids of the present disclosure may be supplied at a high temperature of at least 150° C. and a high pressure of at least 20 MPa. The high pressure and high temperature may facilitate detachment of the layered silicates 110 from sites of the poly(AAm-co-DMAC) polymer 120 and simultaneous or subsequent attachment of the layered silicates 110 to other sites of the polymeric chain to thereby retaining the viscosity of the drilling fluid. Specifically, under extreme downhole conditions, at least one part of the poly(AAm-co-DMAC) polymer 120 may interact with the layered silicate 110. In embodiments, under extreme downhole conditions, one part of the poly(AAm-co-DMAC) polymer 120 may be dissociated from the layered silicate 110. Other part of the poly(AAm-co-DMAC) polymer 120 may be associated with the layered silicate 110 simultaneously, and thus the silicate-poly(AAm-co-DMAC) complex 100 may be preserved. Under extreme downhole conditions, at least one of the first silicate layer 111 and the second silicate layer 112 may interact with the poly(AAm-co-DMAC) polymer 120. In embodiments, both the first silicate layer 111 and the second silicate layer 112 may interact with the poly(AAm-co-DMAC) polymer 120. Under extreme downhole conditions, when the poly(AAm-co-DMAC) polymer 120 disassociated from the first silicate layer 111, the second silicate layer 112 may interact with the poly(AAm-co-DMAC) polymer 120. When the poly(AAm-co-DMAC) polymer 120 disassociated from the second silicate layer 112, the first silicate layer 111 may interact with the poly(AAm-co-DMAC) polymer 120. Interaction between the poly(AAm-co-DMAC) polymer 120 and at least one of the first silicate layer 111 and the second silicate layer 112 may allow preserving the silicate-poly(AAm-co-DMAC) complexes, and thereby improving rheological properties of the drilling fluid under extreme downhole conditions.

Figure 2:
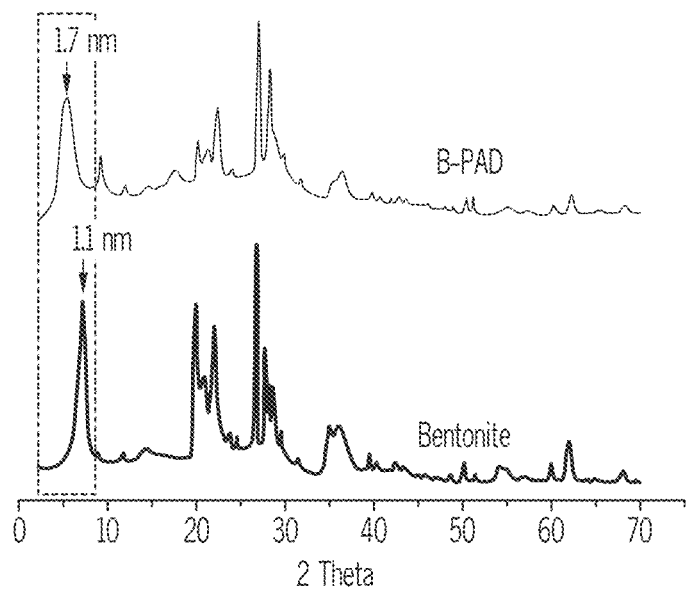
FIG. 2 graphically depicts a X-ray diffraction patterns for Bentonite and B-PAD (the silicate-polymer complex of bentonite and poly(AAm-co-DMAC)
Figure 3:
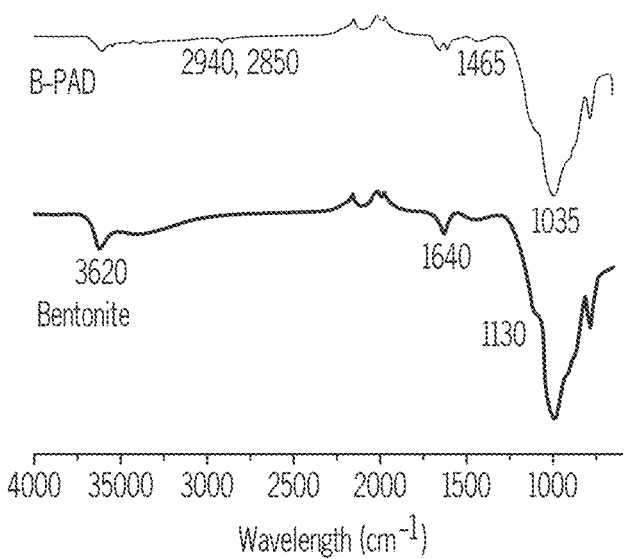
FIG. 3 graphically depicts a FTIR (Fourier-transform infrared) spectroscopy of Bentonite and B-PAD.
Figure 4:
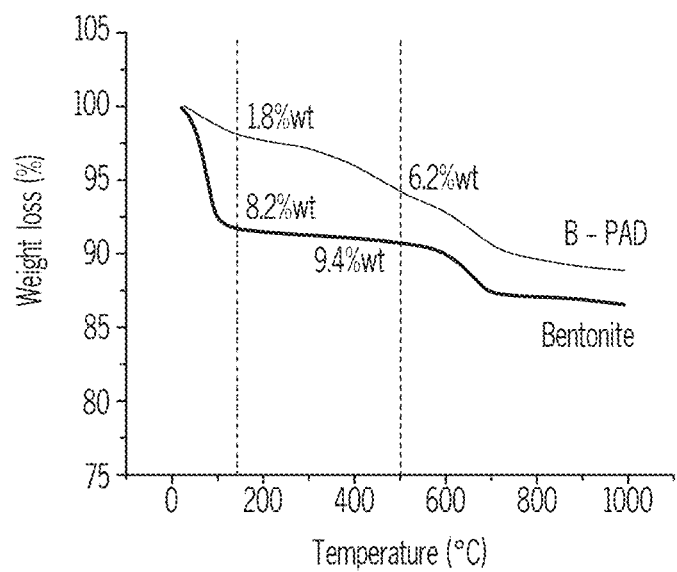
FIG. 4 graphically depicts a thermogravimetric analysis (TGA) for Bentonite and B-PAD.
Figure 5:
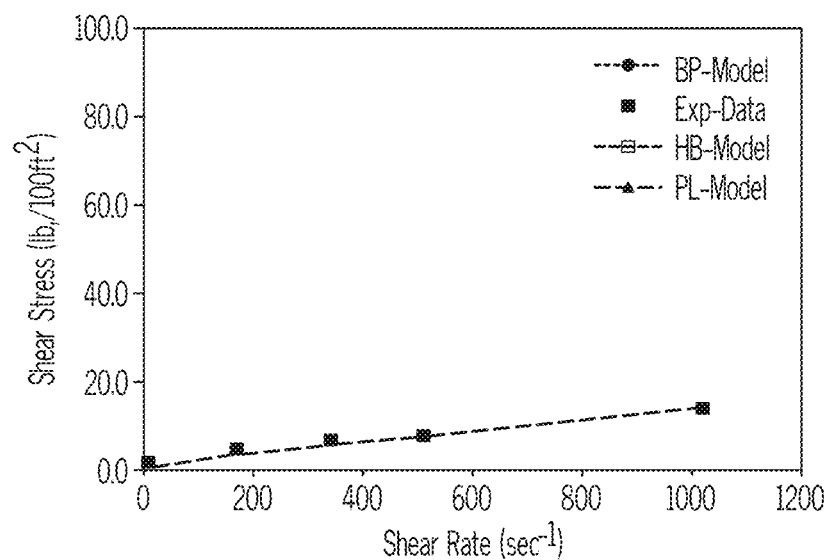
FIG. 5 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Comparative Example 1.
Figure 6:
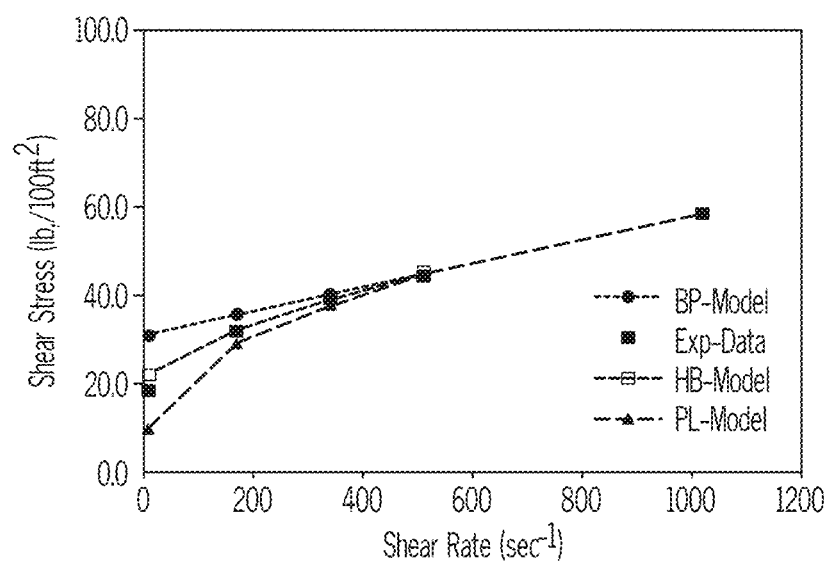
FIG. 6 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Example 1.
Figure 7:
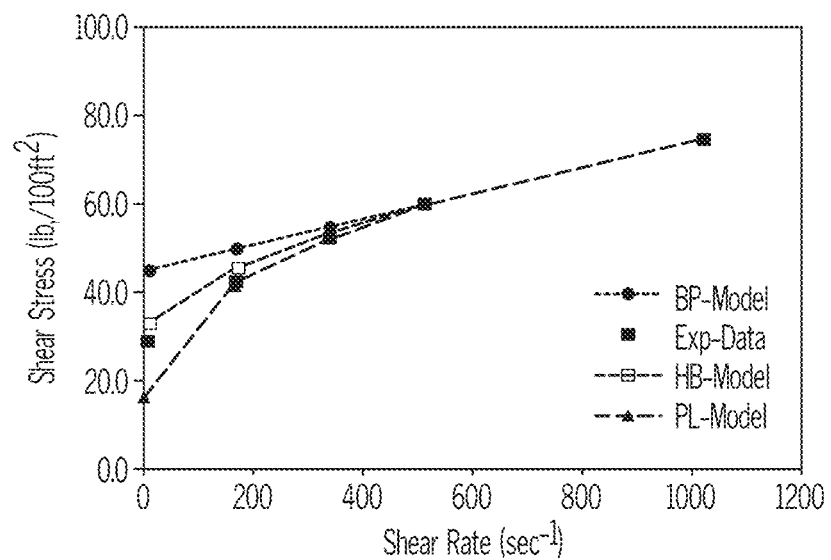
FIG. 7 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Example 2.
Figure 8:
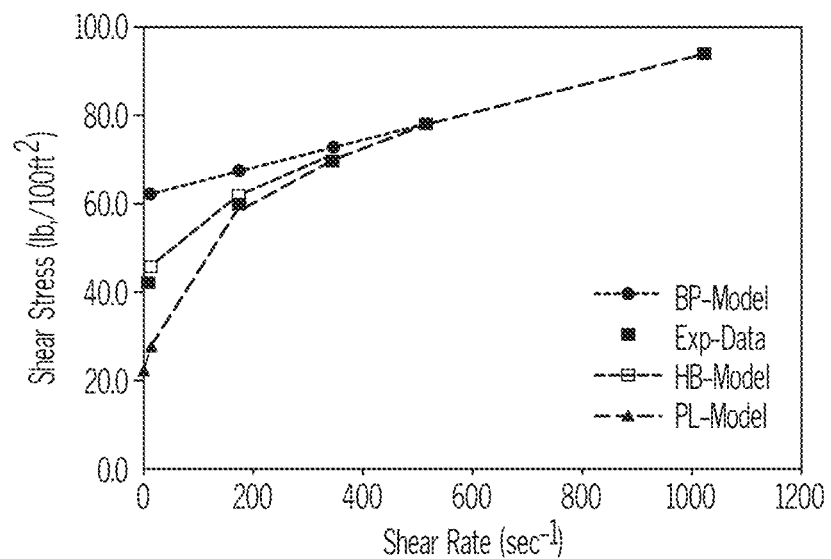
FIG. 8 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Example 3.

FIGS. 2-4 may show the interactions between the layered silicate and the polymer under extreme downhole conditions. Referring to FIGS. 2-4, when the clay-component comprises bentonite and the polymer comprises poly(AAm-co-DMAC), XRD pattern, FTIR spectroscopy, and TGA of bentonite and B-PAD (the silicate-polymer complex of bentonite and poly(AAm-co-DMAC) shows the interaction between the polymer and the layered silicates in bentonite. Referring to FIG. 2, XRD pattern of bentonite and B-PAD show distinct reflections at low 2 theta. The XRD reflection of bentonite at 7.1° shifted to 5.2° upon interaction with polymer. The intercalation of polymer result increase in the basal spacing. Bentonite and B-PAD show basal spacing of 1.1 nm and 1.7 nm, respectively. This observation confirms the intercalation of polymers in the interlayer space of layered silicates present in the bentonite. The position of other characteristic reflections for 2:1 phyllosilicates remained unchanged upon interaction of polymers with layered silicates, which reveals the layered silicates structure remained except change in the interlayer spacing. FIG. 3 depicts the FTIR spectroscopy of the bentonite and B-PAD. Peaks at 3620 and 3698 $cm^{-1}$ are due to the —OH band stretch for Al—OH, Mg—OH, and Si—OH. The shoulders and broadness of the —OH bands are mainly due to contributions of several structural —OH groups occurring in smectite. A peak at 1035 $cm^{-1}$ is assigned for characteristic Si—O—Si linkages in the layered silicates. The overlaid absorption peaks in the region of 1640 $cm^{-1}$ in the FT-IR spectrum is attributed to —OH bending mode of water (adsorbed water). IR peaks at 915, 875, and 836 $cm^{-1}$ are attributed to AlAlOH, AlFeOH, and AlMgOH bending vibration respectively. Peaks at 2940 and 2850 $cm^{-1}$ for organoclays, are ascribed to the asymmetric and symmetric vibration of methylene groups of the aliphatic carbon chain in polymer. In addition, there is also HCH stretching vibration band at 1465 $cm^{-1}$ in the IR spectrum of all organoclays. FIG. 3 supports the formation of organic-inorganic hybrids, B-PAD.

Regarding FIG. 4, TGA of bentonite and B-PAD were conducted to show the thermal stability and degradation pathways of polymers present in the B-PAD. The initial weight loss up to 120° C. corresponds to the adsorbed water in bentonite and B-PAD. Bentonite and B-PAD showed 8.2% wt. and 1.8% wt. weight loss that originated from the removal of water molecules. The degradation of organic content in the materials can be obtained from the changes in the mass loss between 120° C. and 450° C. Bentonite shows only 1.2% wt. while B-PAD shows 4.4% wt. weight loss, which proves the polymer interaction with the layered silicates. FIG. 4 demonstrates the presence of polymers in B-PAD.

In embodiments, the clay-based component may be included in amounts greater than or equal to 0.5 wt. %, greater than or equal to 1 wt. %, or even greater than or equal to 2 wt. %. In embodiments, the amount of clay-based component in the drilling fluid may be less than or equal to 10 wt. %, less than or equal to 7 wt. %, or even less than or equal to 5 wt. %. In embodiments, the amount of clay-based component in the drilling fluid may be from 0.5 wt. % to 10 wt. %, from 0.5 wt. % to 7 wt. %, from 0.5 wt. % to 5 wt. %, from 1 wt. % to 10 wt. %, from 1 wt. % to 7 wt. %, from 1 wt. % to 5 wt. %, from 2 wt. % to 10 wt. %, from 2 wt. % to 7 wt. %, or even from 2 wt. % to 5 wt. %, or any and all sub-ranges formed from any of these endpoints.

In embodiments, the clay-based component may have a density of greater than or equal to 5 lb/gal (0.6 $g/cm^3$), greater than or equal to 6 lb/gal (0.72 $g/cm^3$), or even greater than or equal to 7 lb/gal (0.84 $g/cm^3$). In embodiments, the clay-based component may have a density of less than or equal to 15 lb/gal (1.8 $g/cm^3$), or even less than or equal to 14 lb/gal (1.68 $g/cm^3$). In embodiments, the clay-based component may have a density of from 5 lb/gal (0.6 $g/cm^3$) to 15 lb/gal (1.8 $g/cm^3$), from 5 lb/gal (0.6 $g/cm^3$) to 14 lb/gal (1.68 $g/cm^3$), from 6 lb/gal (0.72 $g/cm^3$) to 15 lb/gal (1.8 $g/cm^3$), from 6 lb/gal (0.72 $g/cm^3$) to 14 lb/gal (1.68 $g/cm^3$), from 7 lb/gal (0.84 $g/cm^3$) to 15 lb/gal (1.8 $g/cm^3$), or even from 7 lb/gal (0.84 $g/cm^3$) to 14 lb/gal (1.68 $g/cm^3$), or any and all sub-ranges formed from any of these endpoints.

The drilling fluid of the present disclosure may comprise a viscosifier additive. The viscosifer additive may interact with the layered silicate, thereby improve the rheology of the drilling fluid under extreme downhole condition. Suitable viscosifier additives may comprise a polymer. In embodiments, the polymer may comprise poly(acrylamide-co-diallyldimethylammonium chloride) (poly(AAm-co-DMAC)).

In embodiments, the polymer may have a high number average molecular weight. In embodiments, a number average molecular weight of the polymer may be greater than or equal to 10,000 g/mol, greater than or equal to 50,000 g/mol, greater than or equal to 100,000 g/mol, greater than or equal to 150,000 g/mol, or even greater than or equal to 200,000 g/mol. In embodiments, a number average molecular weight of the polymer may be less than or equal to 2,000,000 g/mol, less than or equal to 1,500,000 g/mol, or even less than or equal to 1,200,000 g/mol. In embodiments, a number average molecular weight of the polymer may be from 10,000 g/mol to 2,000,000 g/mol, from 10,000 g/mol to 1,500,000 g/mol, from 10,000 g/mol to 1,200,000 g/mol, from 50,000 g/mol to 2,000,000 g/mol, from 50,000 g/mol to 1,500,000 g/mol, from 50,000 g/mol to 1,200,000 g/mol, from 100,000 g/mol to 2,000,000 g/mol, from 100,000 g/mol to 1,500,000 g/mol, from 100,000 g/mol to 1,200,000 g/mol, from 150,000 g/mol to 2,000,000 g/mol, from 150,000 g/mol to 1,500,000 g/mol, from 150,000 g/mol to 1,200,000 g/mol, from 200,000 g/mol to 2,000,000 g/mol, from 200,000 g/mol to 1,500,000 g/mol, or even from 200,000 g/mol to 1,200,000 g/mol, or any and all sub-ranges formed from any of these endpoints.

In embodiments, the viscosifier additive comprises a polymer solution e.g., the polymer in water. In embodiments, the polymer solution may comprise poly(AAm-co-DMAC) in water. In embodiments, the polymer solution may comprise from 5 wt. % to 20 wt. %, from 7 wt. % to 20 wt. %, from 9 wt. % to 20 wt. %, from 5 wt. % to 18 wt. %, from 7 wt. % to 18 wt. %, from 9 wt. % to 18 wt. %, from 5 wt. % to 15 wt. %, from 7 wt. % to 15 wt. %, or from 9 wt. % to 15 wt. % of poly(AAm-co-DMAC) in water.

In embodiments, the viscosifier additive may be included in amounts greater than or equal to 0.01 wt. %, greater than or equal to 0.05 wt. %, or even greater than or equal to 0.1 wt. %. In embodiments, the amount of viscosifier additive in the drilling fluid may be less than or equal to 10 wt. %, less than or equal to 8 wt. %, or even less than or equal to 6 wt. %. In embodiments, the amount of viscosifier additive in the drilling fluid may be from 0.01 wt. % to 10 wt. %, from 0.01 wt. % to 8 wt. %, from 0.01 wt. % to 6 wt. %, from 0.05 wt. % to 10 wt. %, from 0.05 wt. % to 8 wt. %, from 0.05 wt. % to 6 wt. %, from 0.1 wt. % to 10 wt. %, from 0.1 wt. % to 8 wt. %, or even from 0.1 wt. % to 6 wt. %, or any and all sub-ranges formed from any of these endpoints.

In embodiments, a mass ratio of the poly(AAm-co-DMAC) to the layered silicate may be greater than or equal to 1, greater than or equal to 1.25, or even greater than or equal to 1.5. In embodiments, a mass ratio of the poly(AAm-co-DMAC) to the layered silicate may be less than or equal to 9, less than or equal to 8, or even less than or equal to 7. In embodiments, a mass ratio of the poly(AAm-co-DMAC) to the layered silicate may be from 1 to 9, from 1 to 8, from 1 to 7, from 1.25 to 9, from 1.25 to 8, from 1.25 to 7, from 1.5 to 9, from 1.5 to 8, or even from 1.5 to 7, or any and all sub-ranges formed from any of these endpoints.

In embodiments, a ratio of the poly(AAm-co-DMAC) to the layered silicate may be greater than or equal to 0.1 g/100 g, greater than or equal to 0.5 g/100 g, or even greater than or equal to 1.0 g/100 g. In embodiments, a ratio of the poly(AAm-co-DMAC) to the layered silicate may be less than or equal to 20 g/100 g, less than or equal to 18 g/100 g, or even less than or equal to 16 g/100 g. In embodiments, a ratio of the poly(AAm-co-DMAC) to the layered silicate may be from 0.1 g/100 g to 20 g/100 g, from 0.1 g/100 g to 18 g/100 g, from 0.1 g/100 g to 16 g/100 g, from 0.5 g/100 g to 20 g/100 g, from 0.5 g/100 g to 18 g/100 g, from 0.5 g/100 g to 16 g/100 g, from 1.0 g/100 g to 20 g/100 g, from 1.0 g/100 g to 18 g/100 g, or even from 1.0 g/100 g to 16 g/100 g, or any and all sub-ranges formed from any of these endpoints.

The drilling fluids of the present disclosure may be formulated to have specific characteristics, such as a specific yield point, viscosity, density, and gel strength sufficient for the drilling fluids to be suitable for use during drilling operations under extreme downhole conditions. For example, the drilling fluid may be formulated to have a density in a range suitable to provide the necessary hydrostatic pressure to support the sidewalls of the wellbore and prevent fluids in the formation from flowing into the wellbore. Additionally, the drilling fluid may be formulated to have viscosity in a range suitable to allow the drilling fluid to be pumped down through the drill string while still capturing and conveying cuttings from the bottom of the well. To accomplish these functions, the composition of the drilling fluid may be adjusted, such as by adjusting the amounts of the aqueous solution, the clay-based component, the viscosifier additive, or combinations of these.

The drilling fluids of the present disclosure may have a density suitable to provide the necessary hydrostatic pressure to support the sidewalls of the wellbore, prevent fluids in the subterranean formation from flowing into the wellbore, or both. In embodiments, the drilling fluids of the present disclosure may have a density of greater than or equal to 6 lb/gal (0.72 g/cm$^3$), greater than or equal to 7 lb/gal (0.84 g/cm$^3$), or even greater than or equal to 8 lb/gal (0.96 g/cm$^3$). In embodiments, the drilling fluids of the present disclosure may have a density of less than or equal to 22 lb/gal (2.64 g/cm$^3$), less than or equal to 21 lb/gal (2.52 g/cm$^3$), or even less than or equal to 20 lb/gal (2.4 g/cm$^3$). In embodiments, the drilling fluids of the present disclosure may have a density of may be from 6 lb/gal (0.72 g/cm$^3$) to 22 lb/gal (2.64 g/cm$^3$), from 6 lb/gal (0.72 g/cm$^3$) to 21 lb/gal (2.52 g/cm$^3$), from 6 lb/gal (0.72 g/cm$^3$) to 20 lb/gal (2.4 g/cm$^3$), from 7 lb/gal (0.84 g/cm$^3$) to 22 lb/gal (2.64 g/cm$^3$), from 7 lb/gal (0.84 g/cm$^3$) to 21 lb/gal (2.52 g/cm$^3$), from 7 lb/gal (0.84 g/cm$^3$) to 20 lb/gal (2.4 g/cm$^3$), from 8 lb/gal (0.96 g/cm$^3$) to 22 lb/gal (2.64 g/cm$^3$), from 8 lb/gal (0.96 g/cm$^3$) to 21 lb/gal (2.52 g/cm$^3$), or even from 8 lb/gal (0.96 g/cm$^3$) to 20 lb/gal (2.4 g/cm$^3$), or any and all sub-ranges formed from any of these endpoints.

The rheology of the drilling fluid may be determined by measuring the shear stress on the drilling fluid at different shear rates. The various shear rates are utilized since drilling fluids behave as a rigid body at lesser shear stresses but flow as a viscous fluid at greater shear stresses. The rheology of the drilling fluid may be characterized by the gel strength. The gel strength refers to the shear stress of the drilling fluid measured at a low shear rate following a defined period of time during which the drilling fluid is maintained in a static state. The shear stress of the drilling fluid at low shear rate may be measured using a standard oilfield viscometer, such as a FANN® Model 35 viscometer operated at low rpms, such as at 3 rpm or 6 rpm, according to the test methods described in API Recommended Practice For Field Testing Aqueous based Drilling Fluids (RP 13B-1/ISO 10414-1: 2002). To measure the gel strength, the drilling fluid is first stirred by contacting the drilling fluid with the spindle of the viscometer and operating the viscometer at 600 rotations per minute (rpm). The viscometer is then turned off for period of time (time period). For a 10-second gel strength, the time period is 10 seconds, and for a 10 minute gel strength, the time period is 10 minutes. It should be understood that other time periods for measuring gel strength may be used as reference times for measurements of gel strength. During the time period, the drilling fluid comes to rest in a static state. Upon expiration of the time period, the viscometer is turned back on at a low speed, such as 3 rpm for example, to generate a low shear rate. The viscometer reading is then taken. The gel strength of the drilling fluid is reported in units of pounds of force per 100 square feet (lbf/100 ft$^2$). The gel strength of the drilling fluid, such as a 10-second gel strength, a 10-minute gel strength, or both, may be measured at a temperature of from 50° F. (10° C.) to 400° F. (204.44° C.), from 50° F. (10° C.) to 300° F. (148.89° C.), from 50° F. (10° C.) to 200° F. (93.33° C.), from 50° F. (10° C.) to 150° F. (65.56° C.), from 77° F. (25° C.) to 400° F. (204.44° C.), from 77° F. (25° C.) to 300° F. (148.89° C.), from 77° F. (25° C.) to 200° F. (93.33° C.), from 77° F. (25° C.) to 150° F. (65.56° C.), from 100° F. (37.78° C.) to 400° F. (204.44° C.), from 100° F. (37.78° C.) to 300° F. (148.89° C.), from 100° F. (37.78° C.) to 200° F. (93.33° C.), from 100° F. (37.78° C.) to 150° F. (65.56° C.), from 150° F. (65.56° C.) to 400° F. (204.44° C.), from 150° F. (65.56° C.) to 300° F. (148.89° C.), from 150° F. (65.56° C.) to 200° F. (93.33° C.), or any and all sub-ranges formed from any of these endpoints. The gel strength of the drilling fluid, such as a 10-second gel strength, a 10-minute gel strength, or both, may be measured at a pressure of from 14.7 pound per square inch (psi) (0.10 MPa) to 30,000 psi (206.84 MPa), from 14.7 psi (0.10 MPa) to 20,000 psi (137.90 MPa), from 14.7 psi (0.10 MPa) to 10,000 psi (68.95 MPa), from 20 psi (0.14 MPa) to 30,000 psi (206.84 MPa), from 20 psi (0.14 MPa) to 20,000 psi (137.90 MPa), from 20 psi (0.14 MPa) to 10,000 psi (68.95 MPa), from 50 psi (0.34 MPa) to 30,000 psi (206.84 MPa), from 50 psi (0.34 MPa) to 20,000 psi (137.90 MPa), from 50 psi (0.34 MPa) to 10,000 psi (68.95 MPa), from 100 psi (0.69 MPa) to 30,000 psi (206.84 MPa), from 100 psi (0.69 MPa) to 20,000 psi (137.90 MPa), from 100 psi (0.69 MPa) to 10,000 psi (68.95 MPa) or any and all sub-ranges formed from any of these endpoints.

In embodiments, the drilling fluids of the present disclosure may have a 10-second gel strength of greater than or equal to 3 lbf/100 ft$^2$, greater than or equal to 4 lbf/100 ft$^2$, or even greater than or equal to 5 lbf/100 ft$^2$, measured at a temperature of from 77° F. (25° C.) to 150° F. (65.56° C.). In embodiments, the drilling fluids of the present disclosure may have a 10-second gel strength of less than or equal to 110 lbf/100 ft$^2$, less than or equal to 105 lbf/100 ft$^2$, or even less than or equal to 100 lbf/100 ft$^2$, measured at a temperature of from 77° F. (25° C.) to 150° F. (65.56° C.). In embodiments, the drilling fluids of the present disclosure may have a 10-second gel strength of may be from 3 lbf/100 ft$^2$ to 110 lbf/100 ft$^2$, from 3 lbf/100 ft$^2$ to 105 lbf/100 ft$^2$, from 3 lbf/100 ft$^2$ to 100 lbf/100 ft$^2$, from 4 lbf/100 ft$^2$ to 110 lbf/100 ft$^2$, from 4 lbf/100 ft$^2$ to 105 lbf/100 ft$^2$, from 4 lbf/100 ft$^2$ to 100 lbf/100 ft$^2$, from 5 lbf/100 ft$^2$ to 110 lbf/100 ft$^2$, from 5 lbf/100 ft$^2$ to 105 lbf/100 ft$^2$, or even from 5 lbf/100 ft$^2$ to 100 lbf/100 ft$^2$, or any and all sub-ranges formed from any of these endpoints, measured at a temperature of from 77° F. (25° C.) to 150° F. (65.56° C.).

In embodiments, the drilling fluids of the present disclosure may have a 10-minute gel strength of greater than or equal to 3 lbf/100 ft$^2$, greater than or equal to 4 lbf/100 ft$^2$, or even greater than or equal to 5 lbf/100 ft$^2$, measured at a temperature of from 77° F. (25° C.) to 150° F. (65.56° C.). In embodiments, the drilling fluids of the present disclosure may have a 10-minute gel strength of less than or equal to 120 lbf/100 ft$^2$, less than or equal to 115 lbf/100 ft$^2$, or even less than or equal to 110 lbf/100 ft$^2$, measured at a temperature of from 77° F. (25° C.) to 150° F. (65.56° C.). In embodiments, the drilling fluids of the present disclosure may have a 10-minute gel strength of may be from 3 lbf/100 ft$^2$ to 120 lbf/100 ft$^2$, from 3 lbf/100 ft$^2$ to 115 lbf/100 ft$^2$, from 3 lbf/100 ft$^2$ to 110 lbf/100 ft$^2$, from 4 lbf/100 ft$^2$ to 120 lbf/100 ft$^2$, from 4 lbf/100 ft$^2$ to 115 lbf/100 ft$^2$, from 4 lbf/100 ft$^2$ to 110 lbf/100 ft$^2$, from 5 lbf/100 ft$^2$ to 120 lbf/100 ft$^2$, from 5 lbf/100 ft$^2$ to 115 lbf/100 ft$^2$, or even from 5 lbf/100 ft$^2$ to 110 lbf/100 ft$^2$, or any and all sub-ranges formed from any of these endpoints, measured at a temperature of from 77° F. (25° C.) to 150° F. (65.56° C.).

The rheology of the drilling fluid may also be characterized by the apparent viscosity (AV), plastic viscosity (PV) and the yield point (YP), which are parameters from the Bingham plastic rheology model. The apparent viscosity and plastic viscosity are related to the resistance of a drilling fluid to flow due to mechanical interaction between solids, such as fines, in the drilling fluid. The apparent viscosity and plastic viscosity represent the viscosity of the drilling fluid extrapolated to infinite shear rate. The apparent viscosity and plastic viscosity are expressed in centipoise (cP). The apparent viscosity and plastic viscosity reflect the type and concentration of the solids in the hydraulic fracturing fluid.

The apparent viscosity of a drilling fluid may be estimated by measuring the shear stress of the drilling fluid using a rheometer at spindle speeds of 600 rotations per minute (rpm). The apparent viscosity of a drilling fluid is one-half of the dial reading at 600 rpm according to Equation (I).

$$AV\ (cP) = (Dial\ Reading\ at\ 600\ rpm) \div 2 \qquad \text{Equation (I)}$$

In embodiments, the apparent viscosity of the drilling fluid may be measured at a temperature of from 50° F. (10° C.) to 400° F. (204.44° C.), from 50° F. (10° C.) to 300° F. (148.89° C.), from 50° F. (10° C.) to 200° F. (93.33° C.), from 50° F. (10° C.) to 150° F. (65.56° C.), from 77° F. (25° C.) to 400° F. (204.44° C.), from 77° F. (25° C.) to 300° F. (148.89° C.), from 77° F. (25° C.) to 200° F. (93.33° C.), from 77° F. (25° C.) to 150° F. (65.56° C.), from 100° F. (37.78° C.) to 400° F. (204.44° C.), from 100° F. (37.78° C.) to 300° F. (148.89° C.), from 100° F. (37.78° C.) to 200° F. (93.33° C.), from 100° F. (37.78° C.) to 150° F. (65.56° C.), from 150° F. (65.56° C.) to 400° F. (204.44° C.), from 150° F. (65.56° C.) to 300° F. (148.89° C.), from 150° F. (65.56° C.) to 200° F. (93.33° C.), or any and all sub-ranges formed from any of these endpoints. In embodiments, the apparent viscosity of the drilling fluid may be measured at a pressure of from 14.7 pound per square inch (psi) (0.10 MPa) to 30,000 psi (206.84 MPa), from 14.7 psi (0.10 MPa) to 20,000 psi (137.90 MPa), from 14.7 psi (0.10 MPa) to 10,000 psi (68.95 MPa), from 20 psi (0.14 MPa) to 30,000 psi (206.84 MPa), from 20 psi (0.14 MPa) to 20,000 psi (137.90 MPa), from 20 psi (0.14 MPa) to 10,000 psi (68.95 MPa), from 50 psi (0.34 MPa) to 30,000 psi (206.84 MPa), from 50 psi (0.34 MPa) to 20,000 psi (137.90 MPa), from 50 psi (0.34 MPa) to 10,000 psi (68.95 MPa), from 100 psi (0.69 MPa) to 30,000 psi (206.84 MPa), from 100 psi (0.69 MPa) to 20,000 psi (137.90 MPa), from 100 psi (0.69 MPa) to 10,000 psi (68.95 MPa) or any and all sub-ranges formed from any of these endpoints.

In embodiments, the drilling fluids of the present disclosure may have an apparent viscosity of greater than or equal to 15 cP, greater than or equal to 17 cP, or even greater than or equal to 20 cP, measured at a temperature of from 77° F. (25° C.) to 1120° F. (65.56° C.). In embodiments, the drilling fluids of the present disclosure may have an apparent viscosity of less than or equal to 120 cP, less than or equal to 117 cP, or even less than or equal to 115 cP, measured at a temperature of from 77° F. (25° C.) to 1120° F. (65.56° C.). In embodiments, the drilling fluids of the present disclosure may have an apparent viscosity of from 15 cP to 120 cP, from 15 cP to 117 cP, from 15 cP to 115 cP, from 17 cP to 120 cP, from 17 cP to 117 cP, from 17 cP to 115 cP, from 20 cP to 120 cP, from 20 cP to 117 cP, or even from 20 cP to 115 cP, or any and all sub-ranges formed from any of these endpoints, measured at a temperature of from 77° F. (25° C.) to 1120° F. (65.56° C.).

The plastic viscosity of a drilling fluid may be estimated by measuring the shear stress of the drilling fluid using a rheometer at spindle speeds of 300 rpm and 600 rpm and subtracting the 300 rpm dial reading from the 600 rpm dial reading according to Equation (II):

$$PV\ (cP) = (Dial\ Reading\ at\ 600\ rpm) - (Dial\ Reading\ at\ 300\ rpm) \qquad \text{Equation (II)}$$

In embodiments, the plastic viscosity of the drilling fluid may be measured at a temperature of from 50° F. (10° C.) to 400° F. (204.44° C.), from 50° F. (10° C.) to 300° F. (148.89° C.), from 50° F. (10° C.) to 200° F. (93.33° C.), from 50° F. (10° C.) to 150° F. (65.56° C.), from 77° F. (25° C.) to 400° F. (204.44° C.), from 77° F. (25° C.) to 300° F. (148.89° C.), from 77° F. (25° C.) to 200° F. (93.33° C.), from 77° F. (25° C.) to 150° F. (65.56° C.), from 100° F. (37.78° C.) to 400° F. (204.44° C.), from 100° F. (37.78° C.) to 300° F. (148.89° C.), from 100° F. (37.78° C.) to 200° F. (93.33° C.), from 100° F. (37.78° C.) to 150° F. (65.56° C.), from 150° F. (65.56° C.) to 400° F. (204.44° C.), from 150° F. (65.56° C.)

to 300° F. (148.89° C.), from 150° F. (65.56° C.) to 200° F. (93.33° C.), or any and all sub-ranges formed from any of these endpoints. In embodiments, the plastic viscosity of the drilling fluid may be measured at a pressure of from 14.7 pound per square inch (psi) (0.10 MPa) to 30,000 psi (206.84 MPa), from 14.7 psi (0.10 MPa) to 20,000 psi (137.90 MPa), from 14.7 psi (0.10 MPa) to 10,000 psi (68.95 MPa), from 20 psi (0.14 MPa) to 30,000 psi (206.84 MPa), from 20 psi (0.14 MPa) to 20,000 psi (137.90 MPa), from 20 psi (0.14 MPa) to 10,000 psi (68.95 MPa), from 50 psi (0.34 MPa) to 30,000 psi (206.84 MPa), from 50 psi (0.34 MPa) to 20,000 psi (137.90 MPa), from 50 psi (0.34 MPa) to 10,000 psi (68.95 MPa), from 100 psi (0.69 MPa) to 30,000 psi (206.84 MPa), from 100 psi (0.69 MPa) to 20,000 psi (137.90 MPa), from 100 psi (0.69 MPa) to 10,000 psi (68.95 MPa) or any and all sub-ranges formed from any of these endpoints.

In embodiments, the drilling fluids of the present disclosure may have a plastic viscosity of greater than or equal to 3 cP, greater than or equal to 4 cP, or even greater than or equal to 5 cP, measured at a temperature of from 77° F. (25° C.) to 40° F. (65.56° C.). In embodiments, the drilling fluids of the present disclosure may have a plastic viscosity of less than or equal to 70 cP, less than or equal to 67 cP, or even less than or equal to 65 cP, measured at a temperature of from 77° F. (25° C.) to 40° F. (65.56° C.). In embodiments, the drilling fluids of the present disclosure may have a plastic viscosity of from 3 cP to 70 cP, from 3 cP to 67 cP, from 3 cP to 65 cP, from 4 cP to 70 cP, from 4 cP to 67 cP, from 4 cP to 65 cP, from 5 cP to 70 cP, from 5 cP to 67 cP, or even from 5 cP to 65 cP, or any and all sub-ranges formed from any of these endpoints, measured at a temperature of from 77° F. (25° C.) to 40° F. (65.56° C.).

Drilling fluids may behave as a rigid body when the shear stress is less than the yield point, and drilling fluids may flow as a viscous fluid when the shear stress is greater than the yield point. In other words, the yield point represents the amount of stress required to move the drilling fluid from a static condition. The yield point of a drilling fluid is expressed as a force per area, such as pounds of force per one hundred square feet (lbf/100 ft$^2$). Yield point provides an indication of the ability of a drilling fluid to carry solids, such as cuttings through the annulus, which, in simplified terms, gives an indication of the ability of a drilling fluid to lift cuttings away from the bottom of the subterranean formation. The yield point of a drilling fluid is determined by extrapolating the Bingham plastic rheology model to a shear rate of zero. The yield point of a drilling fluid may be estimated from the plastic viscosity of the drilling fluid (as measured in accordance with Equation 2, as previously described) according to Equation (III):

$$YP = (\text{Dial Reading at 300 rpm}) - PV \qquad \text{Equation (III)}$$

In embodiments, the yield point of the drilling fluid may be measured at a temperature of from 50° F. (10° C.) to 400° F. (204.44° C.), from 50° F. (10° C.) to 300° F. (148.89° C.), from 50° F. (10° C.) to 200° F. (93.33° C.), from 50° F. (10° C.) to 150° F. (65.56° C.), from 77° F. (25° C.) to 400° F. (204.44° C.), from 77° F. (25° C.) to 300° F. (148.89° C.), from 77° F. (25° C.) to 200° F. (93.33° C.), from 77° F. (25° C.) to 150° F. (65.56° C.), from 100° F. (37.78° C.) to 400° F. (204.44° C.), from 100° F. (37.78° C.) to 300° F. (148.89° C.), from 100° F. (37.78° C.) to 200° F. (93.33° C.), from 100° F. (37.78° C.) to 150° F. (65.56° C.), from 150° F. (65.56° C.) to 400° F. (204.44° C.), from 150° F. (65.56° C.) to 300° F. (148.89° C.), from 150° F. (65.56° C.) to 200° F. (93.33° C.), or any and all sub-ranges formed from any of these endpoints. In embodiments, the yield point of the drilling fluid may be measured at a pressure of from 14.7 pound per square inch (psi) (0.10 MPa) to 30,000 psi (206.84 MPa), from 14.7 psi (0.10 MPa) to 20,000 psi (137.90 MPa), from 14.7 psi (0.10 MPa) to 10,000 psi (68.95 MPa), from 20 psi (0.14 MPa) to 30,000 psi (206.84 MPa), from 20 psi (0.14 MPa) to 20,000 psi (137.90 MPa), from 20 psi (0.14 MPa) to 10,000 psi (68.95 MPa), from 50 psi (0.34 MPa) to 30,000 psi (206.84 MPa), from 50 psi (0.34 MPa) to 20,000 psi (137.90 MPa), from 50 psi (0.34 MPa) to 10,000 psi (68.95 MPa), from 100 psi (0.69 MPa) to 30,000 psi (206.84 MPa), from 100 psi (0.69 MPa) to 20,000 psi (137.90 MPa), from 100 psi (0.69 MPa) to 10,000 psi (68.95 MPa) or any and all sub-ranges formed from any of these endpoints.

In embodiments, the drilling fluids of the present disclosure may have a yield point of greater than or equal to 10 lbf/100 ft$^2$, greater than or equal to 15 lbf/100 ft$^2$, or even greater than or equal to 20 lbf/100 ft$^2$, measured at a temperature of from 77° F. (25° C.) to 150° F. (65.56° C.). In embodiments, the drilling fluids of the present disclosure may have a yield point of less than or equal to 220 lbf/100 ft$^2$, less than or equal to 210 lbf/100 ft$^2$, or even less than or equal to 200 lbf/100 ft$^2$, measured at a temperature of from 77° F. (25° C.) to 150° F. (65.56° C.). In embodiments, the drilling fluids of the present disclosure may have a yield point of may be from 10 lbf/100 ft$^2$ to 220 lbf/100 ft$^2$, from 10 lbf/100 ft$^2$ to 210 lbf/100 ft$^2$, from 10 lbf/100 ft$^2$ to 200 lbf/100 ft$^2$, from 15 lbf/100 ft$^2$ to 220 lbf/100 ft$^2$, from 15 lbf/100 ft$^2$ to 210 lbf/100 ft$^2$, from 15 lbf/100 ft$^2$ to 200 lbf/100 ft$^2$, from 20 lbf/100 ft$^2$ to 220 lbf/100 ft$^2$, from 20 lbf/100 ft$^2$ to 210 lbf/100 ft$^2$, or even from 20 lbf/100 ft$^2$ to 200 lbf/100 ft$^2$, or any and all sub-ranges formed from any of these endpoints, measured at a temperature of from 77° F. (25° C.) to 150° F. (65.56° C.).

The drilling fluid of the present disclosure may be used in drilling operations, such as drilling a subterranean well under the extreme downhole conditions. A drill may be operated in a subterranean formation in the presence of a drilling fluid. The drilling fluid may be in accordance with any of the embodiments previously described. In embodiments, the drilling fluid may be introduced into the subterranean formation. Introducing may involve injecting the drilling fluid into the subterranean formation. In embodiments, the drilling fluid may be injected through a drill string of the drill to a drill bit. In embodiments, the subterranean formation may be a well. The drilling fluid may at least be partially circulated within the subterranean formation. Recirculating the drilling fluid may allow the drilling fluid to cool and lubricate the drill bit and to lift cuttings away from the drill bit, carrying the cuttings upwards to the surface to clean the wellbore. The drilling fluid may additionally provide hydrostatic pressure to support the sidewalls of the wellbore and prevent the sidewalls from collapsing onto the drill string.

EXAMPLES

The various embodiments of drilling fluids will be further clarified by the following examples. The examples are illustrative in nature, and should not be understood to limit the subject matter of the present disclosure.

Table 2 below shows the formulations used to form Comparative Examples C1 to C5 and Examples E1 to E9.

TABLE 2

| Ingredient | C1 g | C2 g | C3 g | C4 g | C5 g | E1 g | E2 g | E3 g | E4 g | E5 g | E6 g | E7 g | E8 g | E9 g |
|---|---|---|---|---|---|---|---|---|---|---|---|---|---|---|
| Water | 323.0 | 185.0 | 185.0 | 185.0 | 185.0 | 321.0 | 319.5 | 318.0 | 319.5 | 318.0 | 185.0 | 185.0 | 185.0 | 185.0 |
| NaBr brine | — | 235.5 | — | — | — | — | — | — | — | — | 228.0 | — | — | — |
| CaCl$_2$ brine | — | — | 218.7 | — | — | — | — | — | — | — | — | 211.7 | — | — |
| ZnBr$_2$ brine | — | — | — | 386.2 | — | — | — | — | — | — | — | — | 373.9 | — |
| Cs Formate brine | — | — | — | — | 340.6 | — | — | — | — | — | — | — | — | 329.8 |
| Bentonite | 14.9 | 14.9 | 14.9 | 14.9 | 14.9 | 14.9 | 14.9 | 14.9 | 14.9 | 14.9 | 14.9 | 14.9 | 14.9 | 14.9 |
| Poly(AAm-co-DMAC) solution | — | — | — | — | — | 2.5 | 3.75 | 5.0 | 6.0 | 7.5 | 5.0 | 5.0 | 5.0 | 5.0 |

Comparative Example 1

As shown in Table 2, in Comparative Example 1, a drilling fluid comprising water and bentonite was prepared through high shear mixing (11,500 RPM) of the components. A Model 9B five spindle was used as a mixer. First, 323.0 g of the water was added in the mixer. Then, 14.9 g of bentonite having a density of 8.4 lb/gal was added in the mixer. The mixture was sheared for 20 minutes, and then aged by hot rolling in an oven at 150° F. for 16 hours.

Comparative Example 2

As shown in Table 2, in Comparative Example 2, a drilling fluid comprising water, bentonite, and NaBr brine was prepared through high shear mixing (11,500 RPM) of the components. A Model 9B five spindle was used as a mixer. First, 185.0 g of the water was added in the mixer. This mixer meets API Specification 13A for mixing the drilling fluid. Then, 14.9 g of bentonite having a density of 10.3 lb/gal was added in the mixer. The mixture was sheared for 20 minutes, and then 235.5 g of NaBr brine having a density of 1.5 g/cm$^3$ was added. The mixture was sheared for 5 minutes and the aged by hot rolling in an oven at 150° F. for 16 hours.

Comparative Example 3

As shown in Table 2, in Comparative Example 3, a drilling fluid comprising water, bentonite, and CaCl$_2$ brine was prepared through high shear mixing (11,500 RPM) of the components. A Model 9B five spindle was used as a mixer. First, 185.0 g of the water was added in the mixer. Then, 14.9 g of bentonite having a density of 9.92 lb/gal was added in the mixer. The mixture was sheared for 20 minutes, and then 218.7 g of CaCl$_2$ brine having a density of 1.393 g/cm$^3$ was added. The mixture was sheared for 5 minutes and the aged by hot rolling in an oven at 150° F. for 16 hours.

Comparative Example 4

As shown in Table 2, in Comparative Example 4, a drilling fluid comprising water, bentonite, and ZnBr$_2$ brine was prepared through high shear mixing (11,500 RPM) of the components. A Model 9B five spindle was used as a mixer. First, 185.0 g of the water was added in the mixer. Then, 14.9 g of bentonite having a density of 13.8 lb/gal was added in the mixer. The mixture was sheared for 20 minutes, and then 386.2 g of ZnBr$_2$ brine having a density of 2.46 g/cm$^3$ was added. The mixture was sheared for 5 minutes and the aged by hot rolling in an oven at 150° F. for 16 hours.

Comparative Example 5

As shown in Table 2, in Comparative Example 5, a drilling fluid comprising water, bentonite, and Cs formate was prepared through high shear mixing (11,500 RPM) of the components. A Model 9B five spindle was used as a mixer. First, 185.0 g of the water was added in the mixer. Then, 14.9 g of bentonite having a density of 12.9 lb/gal was added in the mixer. The mixture was sheared for 20 minutes, and then 340.6 g of Cs formate brine having a density of 2.17 g/cm$^3$ was added. The mixture was sheared for 5 minutes and the aged by hot rolling in an oven at 150° F. for 16 hours.

Example 1

As shown in Table 2, in Example 1, a drilling fluid comprising water, bentonite and a polymer was prepared through high shear mixing (11,500 RPM) of the components. Poly(AAm-co-DMAC) solution (10 wt. % of poly (AAm-co-DMAC) in water) was used as a polymer. A Model 9B five spindle was used as a mixer. First, 321.0 g of the water was added in the mixer. Then, 14.9 g of bentonite having a density of 8.4 lb/gal was added in the mixer. The mixture was sheared for 20 minutes, and then 2.5 g of the polymer was added. The mixture was sheared for 10 minutes and the aged by hot rolling in an oven at 150° F. for 16 hours.

Example 2

As shown in Table 2, in Example 2, a drilling fluid comprising water, bentonite and a polymer was prepared through high shear mixing (11,500 RPM) of the components. Poly(AAm-co-DMAC) solution (10 wt. % of Poly (AAm-co-DMAC) in water) was used as a polymer. A Model 9B five spindle was used as a mixer. First, 319.5 g of the water was added in the mixer. Then, 14.9 g of bentonite having a density of 8.4 lb/gal was added in the mixer. The mixture was sheared for 20 minutes, and then 3.75 g of the polymer was added. The mixture was sheared for 10 minutes and the aged by hot rolling in an oven at 150° F. for 16 hours.

Example 3

As shown in Table 2, in Example 3, a drilling fluid comprising water, bentonite and a polymer was prepared through high shear mixing (11,500 RPM) of the components. Poly(AAm-co-DMAC) solution (10 wt. % of Poly (AAm-co-DMAC) in water) was used as a polymer. A Model 9B five spindle was used as a mixer. First, 318.0 g of the water was added in the mixer. Then, 14.9 g of bentonite having a density of 8.4 lb/gal was added in the mixer. The mixture was sheared for 20 minutes, and then 5.0 g of the polymer was added. The mixture was sheared for 10 minutes and the aged by hot rolling in an oven at 150° F. for 16 hours.

Example 4

As shown in Table 2, in Example 4, a drilling fluid comprising water, bentonite and a polymer was prepared through high shear mixing (11,500 RPM) of the components. Poly(AAm-co-DMAC) solution (10 wt. % of Poly(AAm-co-DMAC) in water) was used as a polymer. A Model 9B five spindle was used as a mixer. First, 319.5 g of the water was added in the mixer. Then, 14.9 g of bentonite having a density of 8.4 lb/gal was added in the mixer. The mixture was sheared for 20 minutes, and then 6.0 g of the polymer was added. The mixture was sheared for 10 minutes and the aged by hot rolling in an oven at 150° F. for 16 hours.

Example 5

As shown in Table 2, in Example 5, a drilling fluid comprising water, bentonite and a polymer was prepared through high shear mixing (11,500 RPM) of the components. Poly(AAm-co-DMAC) solution (10 wt. % of Poly(AAm-co-DMAC) in water) was used as a polymer. A Model 9B five spindle was used as a mixer. First, 318.0 g of the water was added in the mixer. Then, 14.9 g of bentonite having a density of 8.4 lb/gal was added in the mixer. The mixture was sheared for 20 minutes, and then 7.5 g of the polymer was added. The mixture was sheared for 10 minutes and the aged by hot rolling in an oven at 150° F. for 16 hours.

Example 6

As shown in Table 2, in Example 6, a drilling fluid comprising water, NaBr brine, bentonite and a polymer was prepared through high shear mixing (11,500 RPM) of the components. Poly(AAm-co-DMAC) solution (10 wt. % of Poly(AAm-co-DMAC) in water) was used as a polymer. A Model 9B five spindle was used as a mixer. First, 185.0 g of the water was added in the mixer. Then, 14.9 g of bentonite having a density of 10.3 lb/gal was added in the mixer. The mixture was sheared for 20 minutes, and then 228.0 g of NaBr brine having a density of 1.5 g/cm³ was added. The mixture was sheared for 5 minutes and then 5.0 g of the polymer was added. The mixture was sheared for 10 minutes and the aged by hot rolling in an oven at 150° F. for 16 hours.

Example 7

As shown in Table 2, in Example 7, a drilling fluid comprising water, $CaCl_2$ brine, bentonite and a polymer was prepared through high shear mixing (11,500 RPM) of the components. Poly(AAm-co-DMAC) solution (10 wt. % of Poly(AAm-co-DMAC) in water) was used as a polymer. A Model 9B five spindle was used as a mixer. First, 185.0 g of the water was added in the mixer. Then, 14.9 g of bentonite having a density of 9.92 lb/gal was added in the mixer. The mixture was sheared for 20 minutes, and then 211.7 g of $CaCl_2$ brine having a density of 1.393 g/cm³ was added. The mixture was sheared for 5 minutes and then 5.0 g of the polymer was added. The mixture was sheared for 10 minutes and the aged by hot rolling in an oven at 150° F. for 16 hours.

Example 8

As shown in Table 2, in Example 8, a drilling fluid comprising water, $ZnBr_2$ brine, bentonite and a polymer was prepared through high shear mixing (11,500 RPM) of the components. Poly(AAm-co-DMAC) solution (10 wt. % of Poly(AAm-co-DMAC) in water) was used as a polymer. A Model 9B five spindle was used as a mixer. First, 185.0 g of the water was added in the mixer. Then, 14.9 g of bentonite having a density of 13.8 lb/gal was added in the mixer. The mixture was sheared for 20 minutes, and then 373.9 g of $ZnBr_2$ brine having a density of 2.46 g/cm³ was added. The mixture was sheared for 5 minutes and then 5.0 g of the polymer was added. The mixture was sheared for 10 minutes and the aged by hot rolling in an oven at 150° F. for 16 hours.

Example 9

As shown in Table 2, in Example 9, a drilling fluid comprising water, Cs Formate brine, bentonite and a polymer was prepared through high shear mixing (11,500 RPM) of the components. Poly(AAm-co-DMAC) solution (10 wt. % of Poly(AAm-co-DMAC) in water) was used as a polymer. A Model 9B five spindle was used as a mixer. First, 185.0 g of the water was added in the mixer. Then, 14.9 g of bentonite having a density of 12.9 lb/gal was added in the mixer. The mixture was sheared for 20 minutes, and then 329.8 g of Cs Formate brine having a density of 2.17 g/cm³ was added. The mixture was sheared for 5 minutes and then 5.0 g of the polymer was added. The mixture was sheared for 10 minutes and the aged by hot rolling in an oven at 150° F. for 16 hours.

Rheology of Comparative Example 1 and Examples 1 to 5

The drilling fluid of Comparative Example 1 and Examples 1-5 were evaluated for viscosity, 10-second gel strength, 10-minute gel strength, PV, AV, and YP according to the methods previously described in the present disclosure at ambient pressure and different temperatures (77° F., 120° F., and 150° F.). The results of these evaluations for the drilling fluid of Comparative Example 1 and Examples 1-5 are provided subsequently in Table 3.

TABLE 3

|  | C1 | | | E1 | | | E2 | | |
|---|---|---|---|---|---|---|---|---|---|
|  | 77° F. | 120° F. | 150° F. | 77° F. | 120° F. | 150° F. | 77° F. | 120° F. | 150° F. |
| 600 rpm | 14 | 13 | 11 | 56 | 54 | 51 | 74 | 70 | 65 |
| 300 rpm | 8 | 7 | 7 | 42 | 41 | 40 | 57 | 56 | 54 |
| 200 rpm | 7 | 6 | 5 | 36 | 36 | 36 | 50 | 49 | 48 |
| 100 rpm | 4 | 4 | 4 | 29 | 29 | 29 | 41 | 40 | 41 |
| 6 rpm | 2 | 1 | 2 | 16 | 16 | 20 | 26 | 26 | 32 |
| 3 rpm | 1 | 1 | 2 | 16 | 17 | 20 | 26 | 27 | 28 |
| 10 sec (3 rpm) | 2 | 3 | 4 | 17 | 16 | 20 | 27 | 27 | 25 |
| 10 min (3 rpm) | 5 | 6 | 9 | 22 | 22 | 20 | 34 | 30 | 28 |

TABLE 3-continued

| | | | | | | | | | |
|---|---|---|---|---|---|---|---|---|---|
| PV, cP | 6 | 6 | 4 | 14 | 13 | 11 | 17 | 14 | 11 |
| AV, cP | 7 | 6.5 | 5.5 | 28 | 27 | 25.5 | 37 | 35 | 32.5 |
| YP, lb/100 ft² | 2 | 1 | 3 | 28 | 28 | 29 | 40 | 42 | 43 |

| | E3 | | | E4 | | | E5 | | |
|---|---|---|---|---|---|---|---|---|---|
| | 77° F. | 120° F. | 150° F. | 77° F. | 120° F. | 150° F. | 77° F. | 120° F. | 150° F. |
| 600 rpm | 91 | 88 | 72 | 147 | 142 | 123 | 221 | 212 | 188 |
| 300 rpm | 74 | 73 | 67 | 116 | 114 | 107 | 173 | 170 | 161 |
| 200 rpm | 66 | 65 | 62 | 102 | 101 | 98 | 152 | 150 | 146 |
| 100 rpm | 57 | 56 | 55 | 86 | 85 | 84 | 127 | 125 | 125 |
| 6 rpm | 40 | 40 | 44 | 56 | 56 | 64 | 82 | 82 | 96 |
| 3 rpm | 39 | 39 | 41 | 55 | 56 | 61 | 81 | 83 | 89 |
| 10 sec (3 rpm) | 40 | 39 | 40 | 57 | 55 | 60 | 84 | 82 | 85 |
| 10 min (3 rpm) | 50 | 41 | 40 | 72 | 63 | 60 | 106 | 93 | 88 |
| PV, cP | 17 | 15 | 5 | 31 | 28 | 16 | 48 | 42 | 27 |
| AV, cP | 45.5 | 44 | 36 | 73.5 | 71 | 61.5 | 110.5 | 106 | 94 |
| YP, lb/100 ft² | 57 | 58 | 62 | 85 | 86 | 91 | 125 | 128 | 134 |

As shown in Table 3 and FIGS. 5-8, inclusion of poly(AAm-co-DMAC) and silicates in the bentonite in the drilling fluid of Examples 1-5 resulted in increase in 10-second gel strength, 10-min gel strength, the plastic viscosity, the apparent viscosity, and yield point of the drilling fluid compared to the drilling fluid of Comparative Example 1.

Rheology of Comparative Example 2 and Example 6

The drilling fluid of Comparative Example 2 and Example 6 were evaluated for viscosity, 10-second gel strength, 10-minute gel strength, PV, AV, and YP according to the methods previously described in the present disclosure. The results of these evaluations for the drilling fluid of Comparative Example 2 and Example 6 are provided subsequently in Table 4.

TABLE 4

| | C2 | | | E6 | | |
|---|---|---|---|---|---|---|
| | 77° F. | 120° F. | 150° F. | 77° F. | 120° F. | 150° F. |
| 600 rpm | 18 | 18 | 17 | 60 | 47 | 42 |
| 300 rpm | 13 | 13 | 13 | 46 | 35 | 31 |
| 200 rpm | 11 | 11 | 11 | 39 | 30 | 28 |
| 100 rpm | 9 | 9 | 9 | 32 | 26 | 20 |
| 6 rpm | 5 | 4 | 3 | 15 | 12 | 10 |
| 3 rpm | 4 | 3 | 2 | 11 | 9 | 8 |
| 10 sec (3 rpm) | 5 | 4 | 3 | 11 | 9 | 8 |
| 10 min (3 rpm) | 8 | 5 | 4 | 11 | 9 | 8 |
| PV, cP | 5 | 5 | 4 | 14 | 12 | 11 |
| AV, cP | 9 | 9 | 8.5 | 30 | 23.5 | 21 |
| YP, lb/100 ft² | 8 | 8 | 9 | 32 | 23 | 20 |

Figure 9:
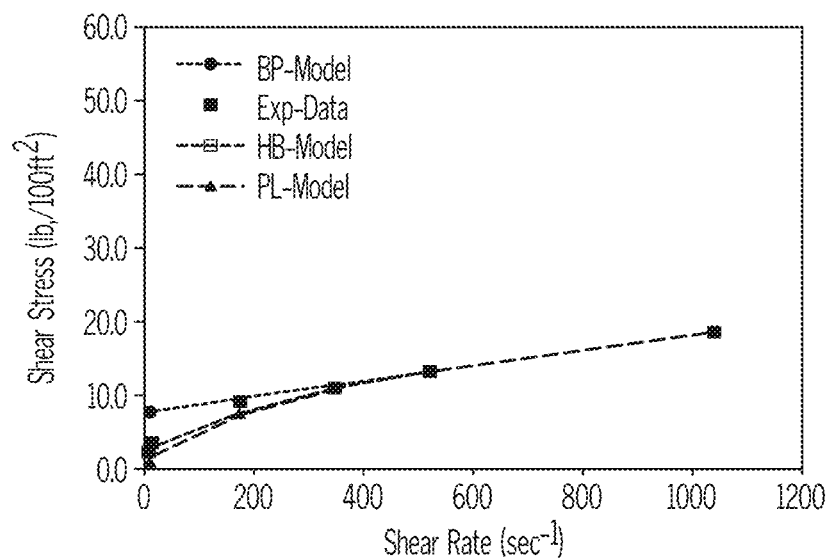
FIG. 9 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Comparative Example 2.
Figure 10:
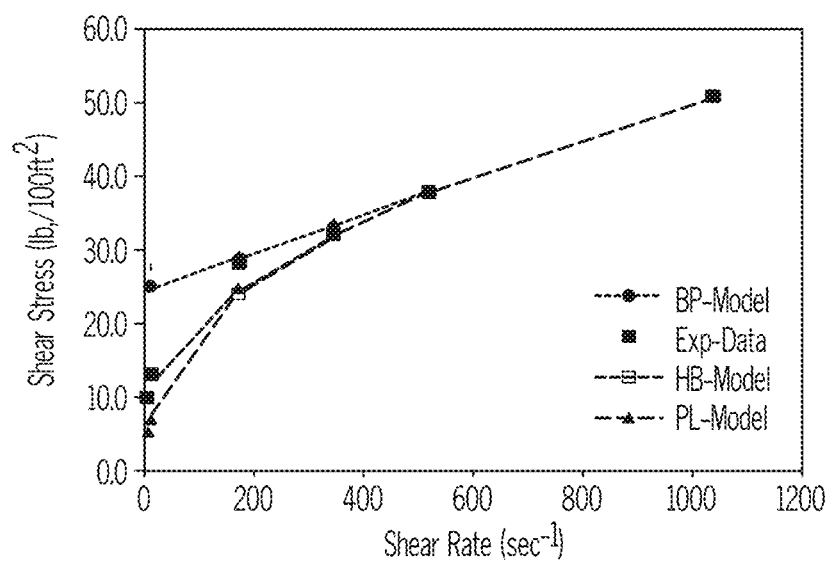
FIG. 10 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Example 6.

As shown in Table 4 and FIGS. 9 and 10, inclusion of poly(AAm-co-DMAC) and silicates in the bentonite in the drilling fluid of Example 6 resulted in increase in 10-second gel strength, 10-min gel strength, the plastic viscosity, the apparent viscosity, and yield point of the drilling fluid compared to the drilling fluid of Comparative Example 2. This demonstrates that poly(AAm-co-DMAC) is compatible with NaBr brine and facilitates enhanced rheological properties.

Rheology of Comparative Example 3 and Example 7

The drilling fluid of Comparative Example 3 and Example 7 were evaluated for viscosity, 10-second gel strength, 10-minute gel strength, PV, AV, and YP according to the methods previously described in the present disclosure. The results of these evaluations for the drilling fluid of Comparative Example 3 and Example 7 are provided subsequently in Table 5.

TABLE 5

| | C3 | | | E7 | | |
|---|---|---|---|---|---|---|
| | 77° F. | 120° F. | 150° F. | 77° F. | 120° F. | 150° F. |
| 600 rpm | 24 | 22 | 21 | 72 | 60 | 49 |
| 300 rpm | 18 | 17 | 17 | 52 | 42 | 36 |
| 200 rpm | 16 | 15 | 15 | 45 | 37 | 32 |
| 100 rpm | 13 | 13 | 13 | 36 | 30 | 26 |
| 6 rpm | 9 | 9 | 9 | 16 | 13 | 11 |
| 3 rpm | 8 | 9 | 8 | 12 | 10 | 8 |
| 10 sec (3 rpm) | 10 | 10 | 9 | 12 | 10 | 8 |
| 10 min (3 rpm) | 12 | 11 | 10 | 12 | 10 | 8 |
| PV, cP | 6 | 5 | 4 | 20 | 18 | 13 |
| AV, cP | 12 | 11 | 10.5 | 36 | 30 | 24.5 |
| YP, lb/100 ft² | 12 | 12 | 13 | 32 | 24 | 23 |

Figure 11:
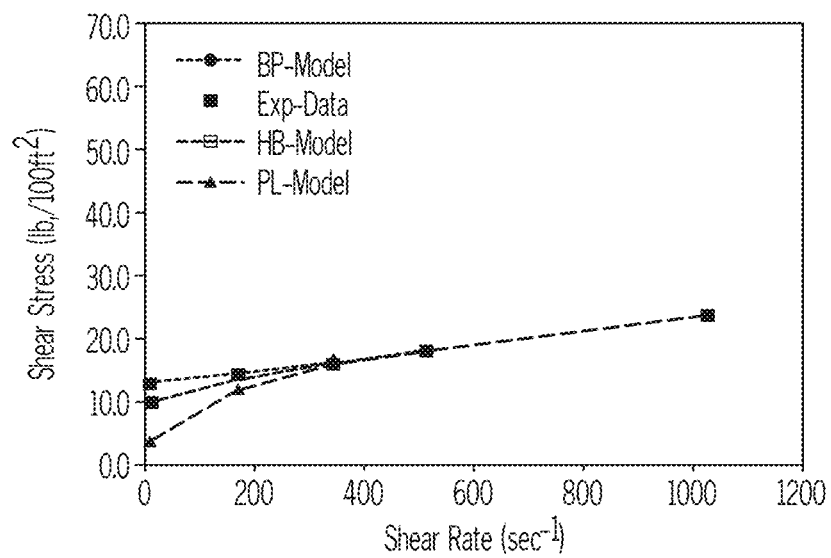
FIG. 11 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Comparative Example 3.
Figure 12:
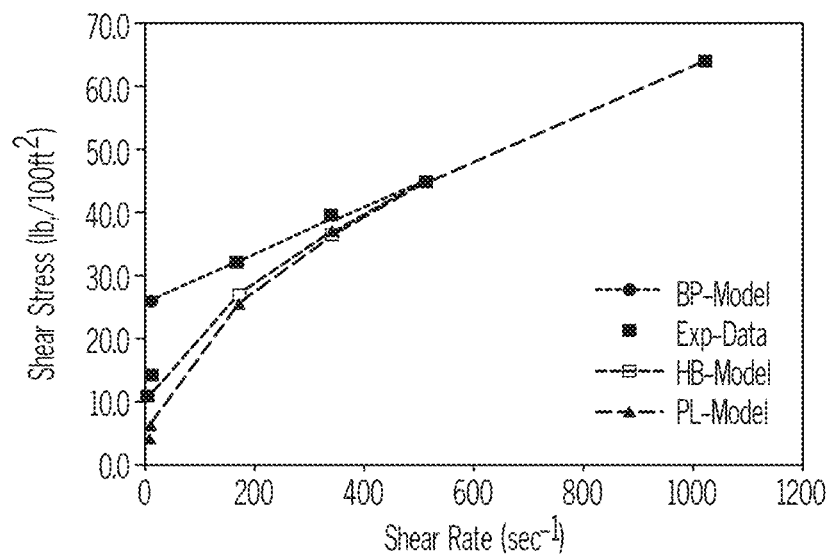
FIG. 12 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Example 7.

As shown in Table 5 and FIGS. 11 and 12, inclusion of poly(AAm-co-DMAC) and silicates in the bentonite in the drilling fluid of Example 7 resulted in increase in 10-second gel strength, 10-min gel strength, the plastic viscosity, the apparent viscosity, and yield point of the drilling fluid compared to the drilling fluid of Comparative Example 3. This demonstrates that poly(AAm-co-DMAC) is compatible with $CaCl_2$ brine and facilitates enhanced rheological properties.

Rheology of Comparative Example 4 and Example 8

The drilling fluid of Comparative Example 4 and Example 8 were evaluated for viscosity, 10-second gel strength, 10-minute gel strength, PV, AV, and YP according to the methods previously described in the present disclosure. The results of these evaluations for the drilling fluid of Comparative Example 4 and Example 8 are provided subsequently in Table 6.

TABLE 6

|  | C4 | | | E8 | | |
| --- | --- | --- | --- | --- | --- | --- |
|  | 77° F. | 120° F. | 150° F. | 77° F. | 120° F. | 150° F. |
| 600 rpm | 32 | 21 | 23 | 80 | 62 | 51 |
| 300 rpm | 24 | 20 | 18 | 59 | 46 | 39 |
| 200 rpm | 20 | 17 | 17 | 50 | 39 | 31 |
| 100 rpm | 16 | 15 | 15 | 39 | 32 | 26 |
| 6 rpm | 10 | 10 | 9 | 19 | 15 | 11 |
| 3 rpm | 9 | 9 | 9 | 14 | 11 | 9 |
| 10 sec (3 rpm) | 9 | 9 | 9 | 14 | 11 | 9 |
| 10 min (3 rpm) | 13 | 10 | 10 | 14 | 11 | 9 |
| PV, cP | 8 | 1 | 5 | 21 | 16 | 12 |
| AV, cP | 16 | 10.5 | 11.5 | 40 | 31 | 25.5 |
| YP, lb/100 ft2 | 16 | 19 | 13 | 38 | 30 | 27 |

Figure 13:
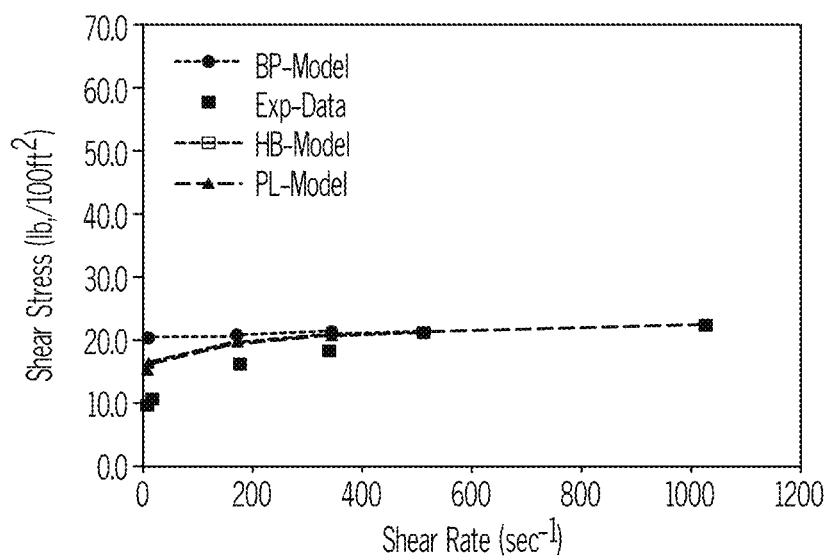
FIG. 13 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Comparative Example 4.
Figure 14:
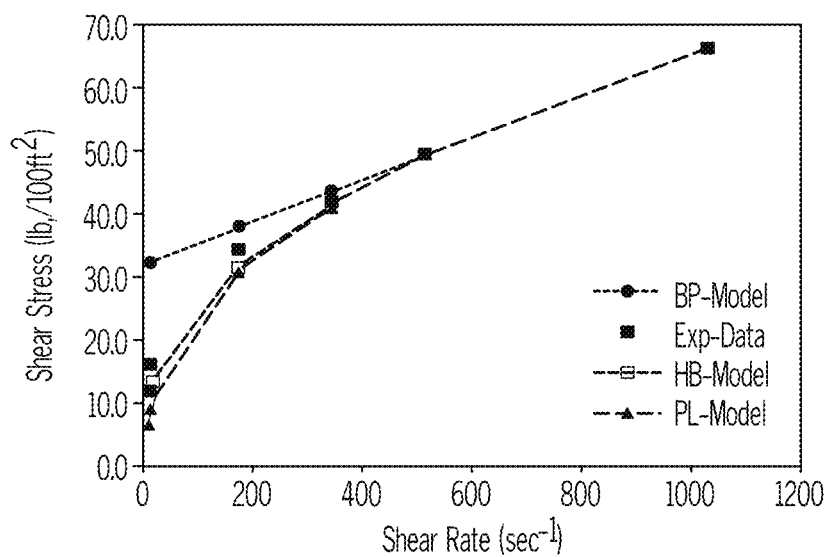
FIG. 14 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Example 8.

As shown in Table 6 and FIGS. 13 and 14, inclusion of poly(AAm-co-DMAC) and silicates in the bentonite in the drilling fluid of Example 8 resulted in increase in 10-second gel strength, 10-min gel strength, the plastic viscosity, the apparent viscosity, and yield point of the drilling fluid compared to the drilling fluid of Comparative Example 4. This demonstrates that poly(AAm-co-DMAC) is compatible with $ZnBr_2$ brine and facilitates enhanced rheological properties.

Rheology of Comparative Example 5 and Example 9

The drilling fluid of Comparative Example 5 and Example 9 were evaluated for viscosity, 10-second gel strength, 10-minute gel strength, PV, AV, and YP according to the methods previously described in the present disclosure at ambient pressure and at 150° F. The results of these evaluations for the drilling fluid of Comparative Example 5 and Example 9 are provided subsequently in Table 7.

TABLE 7

|  | C5 150° F. | E9 150° F. |
| --- | --- | --- |
| 600 rpm | 40 | 50 |
| 300 rpm | 33 | 44 |
| 200 rpm | 30 | 41 |
| 100 rpm | 26 | 36 |
| 6 rpm | 18 | 25 |
| 3 rpm | 16 | 19 |
| 10 sec (3 rpm) | 17 | 20 |
| 10 min (3 rpm) | 18 | 24 |
| PV, cP | 7 | 6 |
| AV, cP | 20 | 25 |
| YP, lb/100 ft² | 26 | 38 |

Figure 15:
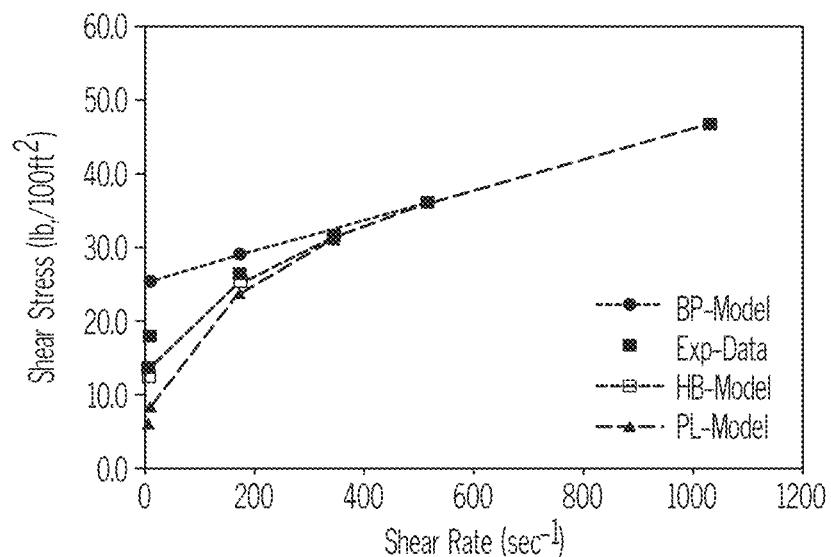
FIG. 15 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Comparative Example 5.
Figure 16:
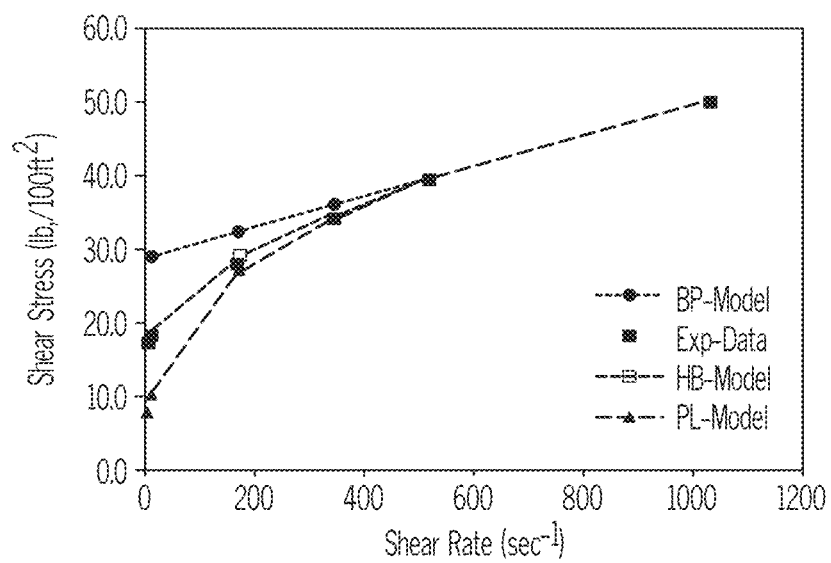
FIG. 16 graphically depicts a sheer stress (y-axis) as a function of a shear rate (x-axis) in Bingham plastic model (BP-model), Experimental rheological data (Exp-data), Herschel-Buckley model (HB-model), and power law model (PL-model), according to Example 9.

As shown in Table 7 and FIGS. 15 and 16, inclusion of poly(AAm-co-DMAC) and silicates in the bentonite in the drilling fluid of Example 9 resulted in increase in 10-second gel strength, 10-min gel strength, the apparent viscosity, and yield point of the drilling fluid compared to the drilling fluid of Comparative Example 5. This demonstrates that poly (AAm-co-DMAC) is compatible with Cs Formate brine and facilitates enhanced rheological properties.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims their equivalents.

A first aspect of the present disclosure is directed to a drilling fluid comprising an aqueous solution; a clay-based component comprising layered silicate; and a viscosifier additive comprising poly(acrylamide-co-diallyldimethylammonium chloride) (poly(AAm-co-DMAC)) polymer. The polymer comprises a number average molecular weight of from 10,000 g/mol to 2,000,000 g/mol. The layered silicate and poly(AAm-co-DMAC) reacts to form a silicate-poly (AAm-co-DMAC) complex within the aqueous solution. A mass ratio of the poly(AAm-co-DMAC) to the layered silicate is 1 to 8.

A second aspect of the present disclosure may include the first aspect, wherein the aqueous solution is a water based solution.

A third aspect of the present disclosure may include either of the first or second aspects, wherein the aqueous solution is a brine based solution.

A fourth aspect of the present disclosure may include any one of the first through third aspects, wherein the brine based solution comprises NaBr brine, $CaCl_2$ brine, $ZnBr_2$ brine, Cs formate brine, or combinations thereof.

A fifth aspect of the present disclosure may include any one of the first through fourth aspects, wherein the drilling fluid comprises from 85 wt. % to 99 wt. % the aqueous solution.

A sixth aspect of the present disclosure may include any one of the first through fifth aspects, wherein the drilling fluid comprises from 0.5 wt. % to 10 wt. % the clay-based component.

A seventh aspect of the present disclosure may include any one of the first through sixth aspects, wherein the drilling fluid comprises from 0.1 wt. % to 5 wt. % the viscosifier additive.

An eighth aspect of the present disclosure may include any one of the first through seventh aspects, wherein the clay-based component comprises bentonite, montmorillonite, hectorites, alumino-silicates, magnesium-silicates, lime (CaO), $CaCO_3$, barium sulfate (barite), hematite ($Fe_2O_3$), mullite ($3Al_2O_3 \cdot 2SiO_2$ or $2Al_2O_3 \cdot SiO_2$), kaolin, ($Al_2Si_2O_5(OH)_4$ or kaolinite), alumina ($Al_2O_3$, or aluminum oxide), silicon carbide, tungsten carbide, or combinations thereof.

A ninth aspect of the present disclosure may include any one of the first through eighth aspects, wherein the drilling fluid comprises a yield point from 20 lbf/100 ft² to 200 lbf/100 ft² measured at a temperature of from 77° F. (25° C.) to 150° F. (65.56° C.).

A tenth aspect of the present disclosure may include any one of the first through ninth aspects, wherein the drilling fluid has a plastic viscosity of from 5 centipoise (cP) to 65 cP when measured at a temperature of from 77° F. (25° C.) to 150° F. (65.56° C.).

An eleventh aspect of the present disclosure may include any one of the first through tenth aspects, wherein the drilling fluid has an apparent viscosity of from 5 cP to 65 cP when measured at a temperature of from 77° F. (25° C.) to 150° F. (65.56° C.).

A twelfth aspect of the present disclosure may include any one of the first through eleventh aspects, wherein the drilling fluid has a density of from 8 lb/gal (0.96 g/cm³) to 20 lb/gal (2.4 g/cm³).

A thirteenth aspect of the present disclosure may include any one of the first through twelfth aspects, wherein the drilling fluid has a 10-second gel strength of from 5 lbf/100 ft² to 100 lbf/100 ft² when measured at a temperature of from 77° F. (25° C.) to 150° F. (65.56° C.).

A fourteenth aspect of the present disclosure may include any one of the first through thirteenth aspects, wherein the drilling fluid has a 10-minute gel strength of from 5 lbf/100 ft$^2$ to 110 lbf/100 ft$^2$ when measured at a temperature of from 77° F. (25° C.) to 150° F. (65.56° C.).

A fifteenth aspect of the present disclosure is directed to a method of drilling a well comprising: supplying the drilling fluid at a high temperature of at least 150° C. and a high pressure of at least 20 MPa. The high pressure and high temperature facilitates detachment of the layered silicates from sites of the poly(AAm-co-DMAC) polymer and simultaneous or subsequent attachment of the layered silicates to other sites of the polymeric chain to thereby retaining the viscosity of the drilling fluid. The drilling fluid comprises an aqueous solution; a clay-based component comprising layered silicate; and a viscosifier additive comprising poly (acrylamide-co-diallyldimethylammonium chloride) (poly (AAm-co-DMAC)) polymer. The polymer comprises a number average molecular weight of from 10,000 g/mol to 2,000,000 g/mol. The layered silicate and poly(AAm-co-DMAC) reacts to form a silicate-poly(AAm-co-DMAC) complex within the aqueous solution. A mass ratio of the poly(AAm-co-DMAC) to the layered silicate is 1 to 8.

It will be apparent to a person of ordinary skill in the art that various modifications and variations can be made without departing from the spirit or scope of the present disclosure. Since modifications, combinations, sub-combinations, and variations of the disclosed embodiments incorporating the spirit and substance of the present disclosure may occur to a person of ordinary skill in the art, the scope of the present disclosure should be construed to include everything within the scope of the appended claims and their equivalents.

It is noted that one or more of the following claims utilize the term "wherein," "in which," or "where" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims. More specifically, although some aspects of the present disclosure are identified as particularly advantageous, it is contemplated that the present disclosure is not necessarily limited to these aspects.

What is claimed is:

1. A drilling fluid comprising:
   an aqueous solution;
   a clay-based component comprising layered silicate;
   a viscosifier additive comprising poly(acrylamide-co-diallyldimethylammonium chloride) (poly(AAm-co-DMAC)) polymer, where the polymer comprises a number average molecular weight of from 100,000 g/mol to 2,000,000 g/mol;
   wherein the layered silicate and poly(AAm-co-DMAC) reacts to form a silicate-poly(AAm-co-DMA) complex within the aqueous solution; and
   wherein a mass ratio of the poly(AAm-co-DMAC) to the layered silicate is 1 to 8.

2. The drilling fluid of claim 1, wherein the aqueous solution is a water based solution.

3. The drilling fluid of claim 1, wherein the aqueous solution is a brine based solution.

4. The drilling fluid of claim 3, wherein the brine based solution comprises NaBr brine, CaCl$_2$ brine, ZnBr$_2$ brine, Cs formate brine, or combinations thereof.

5. The drilling fluid of claim 1, wherein the drilling fluid comprises from 85 wt. % to 99 wt. % the aqueous solution.

6. The drilling fluid of claim 1, wherein the drilling fluid comprises from 0.5 wt. % to 10 wt. % the clay-based component.

7. The drilling fluid of claim 1, wherein the drilling fluid comprises from 0.1 wt. % to 5 wt. % the viscosifier additive.

8. The drilling fluid of claim 1, wherein the clay-based component comprises bentonite, montmorillonite, hectorites, alumino-silicates, magnesium-silicates, lime (CaO), CaCO$_3$, barium sulfate (barite), hematite (Fe$_2$O$_3$), mullite (3Al$_2$O$_3$·2SiO$_2$ or 2Al$_2$O$_3$·SiO$_2$), kaolin, (Al$_2$Si$_2$O$_5$(OH)$_4$ or kaolinite), alumina (Al$_2$O$_3$, or aluminum oxide), silicon carbide, tungsten carbide, or combinations thereof.

9. The drilling fluid of claim 1, wherein the drilling fluid comprises a yield point from 20 lbf/100 ft$^2$ to 200 lbf/100 ft$^2$ measured at a temperature of from 77° F. (25° C.) to 150° F. (65.56° C.).

10. The drilling fluid of claim 1, wherein the drilling fluid has a plastic viscosity of from 5 centipoise (cP) to 65 cP when measured at a temperature of from 77° F. (25° C.) to 150° F. (65.56° C.).

11. The drilling fluid of claim 1, wherein the drilling fluid has an apparent viscosity of from 5 cP to 65 cP when measured at a temperature of from 77° F. (25° C.) to 150° F. (65.56° C.).

12. The drilling fluid of claim 1, wherein the drilling fluid has a density of from 8 lb/gal (0.96 g/cm$^3$) to 20 lb/gal (2.4 g/cm$^3$).

13. The drilling fluid of claim 1, wherein the drilling fluid has a 10-second gel strength of from 5 lbf/100 ft$^2$ to 100 lbf/100 ft$^2$ when measured at a temperature of from 77° F. (25° C.) to 150° F. (65.56° C.).

14. The drilling fluid of claim 1, wherein the drilling fluid has a 10-minute gel strength of from 5 lbf/100 ft$^2$ to 110 lbf/100 ft$^2$ when measured at a temperature of from 77° F. (25° C.) to 150° F. (65.56° C.).

15. A method of drilling a well comprising:
   supplying the drilling fluid of claim 1 at a high temperature of at least 150° C. and a high pressure of at least 20 MPa, wherein the high pressure and high temperature facilitates detachment of the layered silicates from sites of the poly(AAm-co-DMAC) polymer and simultaneous or subsequent attachment of the layered silicates to other sites of the polymeric chain to thereby retaining the viscosity of the drilling fluid.

16. The drilling fluid of claim 1, wherein the polymer comprises a number average molecular weight of from 200,000 g/mol to 1,200,000 g/mol.

17. The drilling fluid of claim 1, wherein the drilling fluid consists of:
   the aqueous solution;

the clay-based component comprising layered silicate; and the viscosifier additive comprising poly(acrylamide-co-diallyldimethylammonium chloride) (poly(AAm-co-DMAC)) polymer.

* * * * *